United States Patent
Zhou et al.

(10) Patent No.: US 12,495,458 B2
(45) Date of Patent: Dec. 9, 2025

(54) MULTI-PATH BEAM FAILURE REPORTING TECHNIQUES

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 445 days.

(21) Appl. No.: 17/709,122

(22) Filed: Mar. 30, 2022

(65) Prior Publication Data

US 2023/0319931 A1    Oct. 5, 2023

(51) Int. Cl.
*H04W 76/18* (2018.01)
*H04W 24/04* (2009.01)

(52) U.S. Cl.
CPC .......... *H04W 76/18* (2018.02); *H04W 24/04* (2013.01)

(58) Field of Classification Search
None
See application file for complete search history.

(56) References Cited

U.S. PATENT DOCUMENTS

| | | | |
|---|---|---|---|
| 2016/0295494 A1* | 10/2016 | Gulati | H04W 72/542 |
| 2017/0078924 A1* | 3/2017 | Rydnell | H04W 36/0077 |
| 2018/0176710 A1* | 6/2018 | Jang | H04W 72/1215 |
| 2018/0249394 A1 | 8/2018 | Nilsson et al. | |
| 2019/0116605 A1* | 4/2019 | Luo | H04B 7/06952 |
| 2019/0150013 A1* | 5/2019 | Zhang | H04B 7/082 375/224 |
| 2019/0150161 A1* | 5/2019 | Cheng | H04W 72/542 370/330 |
| 2019/0158162 A1* | 5/2019 | Ryu | H04B 7/088 |
| 2020/0084735 A1* | 3/2020 | Cheng | H04W 52/365 |
| 2020/0137750 A1* | 4/2020 | Song | H04W 72/23 |
| 2020/0245176 A1* | 7/2020 | Zhou | H04W 24/08 |
| 2021/0352625 A1 | 11/2021 | Akkarakaran et al. | |
| 2022/0321240 A1* | 10/2022 | Zhang | H04B 17/318 |
| 2024/0049028 A1* | 2/2024 | Wang | H04W 36/033 |
| 2024/0284542 A1* | 8/2024 | Chang | H04B 17/328 |

OTHER PUBLICATIONS

International Search Report and Written Opinion—PCT/US2023/013979—ISA/EPO—May 26, 2023.

* cited by examiner

*Primary Examiner* — Steve R Young
(74) *Attorney, Agent, or Firm* — Holland & Hart LLP/Qualcomm Incorporated

(57) ABSTRACT

Methods, systems, and devices for wireless communications are described. A user equipment (UE) may receive, from a network entity via an access link, control signaling indicating a beam condition reporting configuration for reporting an access link beam condition to the network entity via a relay UE. The UE may detect the access link beam condition for the access link in accordance with the beam condition reporting configuration. The UE may transmit via a sidelink to the relay UE, a beam condition report to the relay UE that indicates to relay the beam condition report to the network entity. Additionally, the UE may transmit the beam condition report to the network entity.

28 Claims, 15 Drawing Sheets

MULTI-PATH BEAM FAILURE REPORTING TECHNIQUES

FIELD OF TECHNOLOGY

The following relates to wireless communications, including multi-path beam failure reporting techniques.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A user equipment (UE) and a network entity may use beamforming for communications via an access link. Due to various circumstances, a beam that is used to communicate via the access link may fail (e.g., due to blocking). In such cases, the UE and the network entity may implement beam failure and recovery procedures to resume communications via another beam.

SUMMARY

The described techniques relate to improved methods, systems, devices, and apparatuses that support multi-path beam failure reporting techniques. For example, the described techniques provide for a first user equipment (UE) relaying a beam condition report associated with an access link with a network entity to a second UE (e.g., a relay UE) according to a beam condition reporting configuration received from the network entity. The second UE may transmit the beam condition report, received from the first UE, to the network entity via an access link.

A method for wireless communication at a user equipment (UE) is described. The method may include receiving, from a network entity via an access link, control signaling indicating a beam condition reporting configuration for reporting an access link beam condition to the network entity via a relay UE, detecting the access link beam condition for the access link in accordance with the beam condition reporting configuration, and transmitting, via a sidelink to the relay UE, a beam condition report to the relay UE that indicates to relay the beam condition report to the network entity.

An apparatus for wireless communication at a UE is described. The apparatus may include a memory, a transceiver, and at least one processor of a user equipment, the at least one processor coupled with the memory and the transceiver. The at least one processor may be configured to cause the apparatus to receive, from a network entity via an access link, control signaling indicating a beam condition reporting configuration for reporting an access link beam condition to the network entity via a relay UE, detect the access link beam condition for the access link in accordance with the beam condition reporting configuration, and transmit, via a sidelink to the relay UE, a beam condition report to the relay UE that indicates to relay the beam condition report to the network entity.

Another apparatus for wireless communication at a UE is described. The apparatus may include means for receiving, from a network entity via an access link, control signaling indicating a beam condition reporting configuration for reporting an access link beam condition to the network entity via a relay UE, means for detecting the access link beam condition for the access link in accordance with the beam condition reporting configuration, and means for transmitting, via a sidelink to the relay UE, a beam condition report to the relay UE that indicates to relay the beam condition report to the network entity.

A non-transitory computer-readable medium storing code for wireless communication at a UE is described. The code may include instructions executable by a processor to receive, from a network entity via an access link, control signaling indicating a beam condition reporting configuration for reporting an access link beam condition to the network entity via a relay UE, detect the access link beam condition for the access link in accordance with the beam condition reporting configuration, and transmit, via a sidelink to the relay UE, a beam condition report to the relay UE that indicates to relay the beam condition report to the network entity.

Some examples of the method, apparatuses, and non-transitory computer-readable medium described herein may further include operations, features, means, or instructions for transmitting sidelink data including the beam condition report to the relay UE.

Some examples of the method, apparatuses, and non-transitory computer-readable medium described herein may further include operations, features, means, or instructions for transmitting, to the relay UE via the sidelink, an access link medium access control control element tunneled in sidelink data including the beam condition report.

Some examples of the method, apparatuses, and non-transitory computer-readable medium described herein may further include operations, features, means, or instructions for transmitting a sidelink medium access control control element including the beam condition report to the relay UE.

Some examples of the method, apparatuses, and non-transitory computer-readable medium described herein may further include operations, features, means, or instructions for transmitting, via the access link, the beam condition report to the network entity.

Some examples of the method, apparatuses, and non-transitory computer-readable medium described herein may further include operations, features, means, or instructions for transmitting, to the network entity, uplink control information or a medium access control control element including the beam condition report.

In some examples of the method, apparatuses, and non-transitory computer-readable medium described herein, the beam condition reporting configuration may be selected from a set of multiple different beam condition reporting configurations.

Some examples of the method, apparatuses, and non-transitory computer-readable medium described herein may further include operations, features, means, or instructions for receiving radio resource control signaling indicating a set of multiple different beam condition reporting configurations including the beam condition reporting configuration.

Some examples of the method, apparatuses, and non-transitory computer-readable medium described herein may further include operations, features, means, or instructions for receiving second control signaling indicating to switch from the beam condition reporting configuration to a second beam condition reporting configuration, where the second beam condition reporting configuration indicates to monitor a same access link beam as the beam condition reporting configuration or a different access link beam than the beam condition reporting configuration, detecting a second access link beam condition for the access link in accordance with the second beam condition reporting configuration, and transmitting, via the sidelink to the relay UE, a second beam condition report that indicates to relay the second beam condition report to the network entity.

Some examples of the method, apparatuses, and non-transitory computer-readable medium described herein may further include operations, features, means, or instructions for receiving downlink control information or a medium access control control element indicating a switch from the beam condition reporting configuration to a second beam condition reporting configuration.

In some examples of the method, apparatuses, and non-transitory computer-readable medium described herein, the control signaling indicates an access link quality threshold associated with the access link beam condition and a quality of service threshold associated with access link data.

In some examples of the method, apparatuses, and non-transitory computer-readable medium described herein, transmitting the beam condition report to the relay UE may include operations, features, means, or instructions for transmitting the beam condition report based on the access link beam condition satisfying the access link quality threshold or the quality of service threshold.

In some examples of the method, apparatuses, and non-transitory computer-readable medium described herein, receiving the control signaling may include operations, features, means, or instructions for receiving a control message that indicates activation or deactivation of the beam condition reporting configuration.

Some examples of the method, apparatuses, and non-transitory computer-readable medium described herein may further include operations, features, means, or instructions for transmitting a control message that requests activation or deactivation of the beam condition reporting configuration.

A method for wireless communication at a relay UE is described. The method may include receiving, from a network entity via an access link, control signaling indicating a beam condition reporting configuration that indicates to relay a beam condition report from a first UE to the network entity, receiving, via a sidelink from the first UE, a beam condition report that indicates an access link beam condition between the first UE and the network entity, and transmitting, via the access link, the beam condition report to the network entity in accordance with the beam condition reporting configuration.

An apparatus for wireless communication at a relay UE is described. The apparatus may include a memory, a transceiver, and at least one processor of the relay user equipment, the at least one processor coupled with the memory and the transceiver. The at least one processor may be configured to cause the apparatus to receive, from a network entity via an access link, control signaling indicating a beam condition reporting configuration that indicates to relay a beam condition report from a first UE to the network entity, receive, via a sidelink from the first UE, a beam condition report that indicates an access link beam condition between the first UE and the network entity, and transmit, via the access link, the beam condition report to the network entity in accordance with the beam condition reporting configuration.

Another apparatus for wireless communication at a relay UE is described. The apparatus may include means for receiving, from a network entity via an access link, control signaling indicating a beam condition reporting configuration that indicates to relay a beam condition report from a first UE to the network entity, means for receiving, via a sidelink from the first UE, a beam condition report that indicates an access link beam condition between the first UE and the network entity, and means for transmitting, via the access link, the beam condition report to the network entity in accordance with the beam condition reporting configuration.

A non-transitory computer-readable medium storing code for wireless communication at a relay UE is described. The code may include instructions executable by a processor to receive, from a network entity via an access link, control signaling indicating a beam condition reporting configuration that indicates to relay a beam condition report from a first UE to the network entity, receive, via a sidelink from the first UE, a beam condition report that indicates an access link beam condition between the first UE and the network entity, and transmit, via the access link, the beam condition report to the network entity in accordance with the beam condition reporting configuration.

Some examples of the method, apparatuses, and non-transitory computer-readable medium described herein may further include operations, features, means, or instructions for receiving, via the sidelink, sidelink data including the beam condition report.

Some examples of the method, apparatuses, and non-transitory computer-readable medium described herein may further include operations, features, means, or instructions for receiving, via the sidelink, an access link medium access control control element tunneled in sidelink data including the beam condition report.

Some examples of the method, apparatuses, and non-transitory computer-readable medium described herein may further include operations, features, means, or instructions for receiving a sidelink medium access control control element including the beam condition report.

A method for wireless communication at a network entity is described. The method may include transmitting, to a first UE via a first access link, first control signaling indicating a beam condition reporting configuration for reporting an access link beam condition to the network entity via a relay UE, transmitting, to a relay UE via a second access link, second control signaling indicating the beam condition reporting configuration that indicates to relay a beam condition report from the first UE to the network entity; and, and receiving, from the relay UE via the second access link, the beam condition report of the first UE.

An apparatus for wireless communication at a network entity is described. The apparatus may include a memory, a transceiver, and at least one processor of a network entity, the at least one processor coupled with the memory and the transceiver. The at least one processor may be configured to cause the apparatus to transmit, to a first UE via a first access link, first control signaling indicating a beam condition reporting configuration for reporting an access link beam condition to the network entity via a relay UE, transmit, to a relay UE via a second access link, second control signaling indicating the beam condition reporting configuration that indicates to relay a beam condition report from the first UE to the network entity; and, and receive, from the relay UE via the second access link, the beam condition report of the first UE.

Another apparatus for wireless communication at a network entity is described. The apparatus may include means for transmitting, to a first UE via a first access link, first control signaling indicating a beam condition reporting configuration for reporting an access link beam condition to the network entity via a relay UE, means for transmitting, to a relay UE via a second access link, second control signaling indicating the beam condition reporting configuration that indicates to relay a beam condition report from the first UE to the network entity; and, and means for receiving, from the relay UE via the second access link, the beam condition report of the first UE.

A non-transitory computer-readable medium storing code for wireless communication at a network entity is described. The code may include instructions executable by a processor to transmit, to a first UE via a first access link, first control signaling indicating a beam condition reporting configuration for reporting an access link beam condition to the network entity via a relay UE, transmit, to a relay UE via a second access link, second control signaling indicating the beam condition reporting configuration that indicates to relay a beam condition report from the first UE to the network entity; and, and receive, from the relay UE via the second access link, the beam condition report of the first UE.

In some examples of the method, apparatuses, and non-transitory computer-readable medium described herein, receiving the beam condition report may include operations, features, means, or instructions for receiving, from the relay UE via the second access link, uplink data including the beam condition report.

Some examples of the method, apparatuses, and non-transitory computer-readable medium described herein may further include operations, features, means, or instructions for receiving, from the relay UE via the second access link, an access link medium access control control element including the beam condition report.

Some examples of the method, apparatuses, and non-transitory computer-readable medium described herein may further include operations, features, means, or instructions for receiving the beam condition report from the first UE via the first access link.

Some examples of the method, apparatuses, and non-transitory computer-readable medium described herein may further include operations, features, means, or instructions for receiving, from the first UE via the first access link, uplink control information or a medium access control control element including the beam condition report.

In some examples of the method, apparatuses, and non-transitory computer-readable medium described herein, transmitting the first control signaling may include operations, features, means, or instructions for transmitting the first control signaling indicating the beam condition reporting configuration from a set of multiple different beam condition reporting configurations.

In some examples of the method, apparatuses, and non-transitory computer-readable medium described herein, transmitting the first control signaling may include operations, features, means, or instructions for transmitting downlink control information or a medium access control control element indicating to switch from the beam condition reporting configuration to a second beam condition reporting configuration.

DETAILED DESCRIPTION

In wireless communications systems, a network entity and a user equipment (UE) may use beamforming when communicating via an access link. In some beam failure detection and recovery procedures, a UE may signal a network entity either via a beam failure report (BFR) communicated in a random access channel (RACH) of a primary cell (PCell) or a BFR communicated in a scheduling request (SR) via a secondary cell. Signaling a BFR via RACH and/or SR is time and power consuming. Further, some systems may limit the UE to reporting beam failure, and do not provide for the UE to report a condition of a beam used for communication via an access link. Additionally, a UE using a beam that is failing to transmit a BFR may result in the network entity not receiving the BFR, thus requiring the UE to reestablish connectivity with the network entity, resulting in latency.

Implementations described herein support a first UE using a sidelink to relay a beam condition report to a relay UE, where the relay UE forwards the beam condition report to a network entity. A network entity may transmit control signaling to configure the first UE to monitor a condition of a beam used for communications between the first UE and the network entity. The control signaling may also configure the first UE to transmit a beam condition report via a sidelink channel to a relay UE, via the access link, or both. The network entity may similarly configure the relay UE. Beneficially, the first UE may utilize a sidelink and the relay UE to forward a beam condition report that provides a redundant path to the network entity.

Aspects of the disclosure are initially described in the context of wireless communications systems. Aspects of the disclosure are further described with respect to wireless communications system illustrating using relay links to report access link beam conditions and a process flow diagram illustrating communications between devices to support using relay links to report access link beam conditions. Aspects of the disclosure are further illustrated by and described with reference to apparatus diagrams, system diagrams, and flowcharts that relate to multi-path beam failure reporting techniques.

Figure 1:
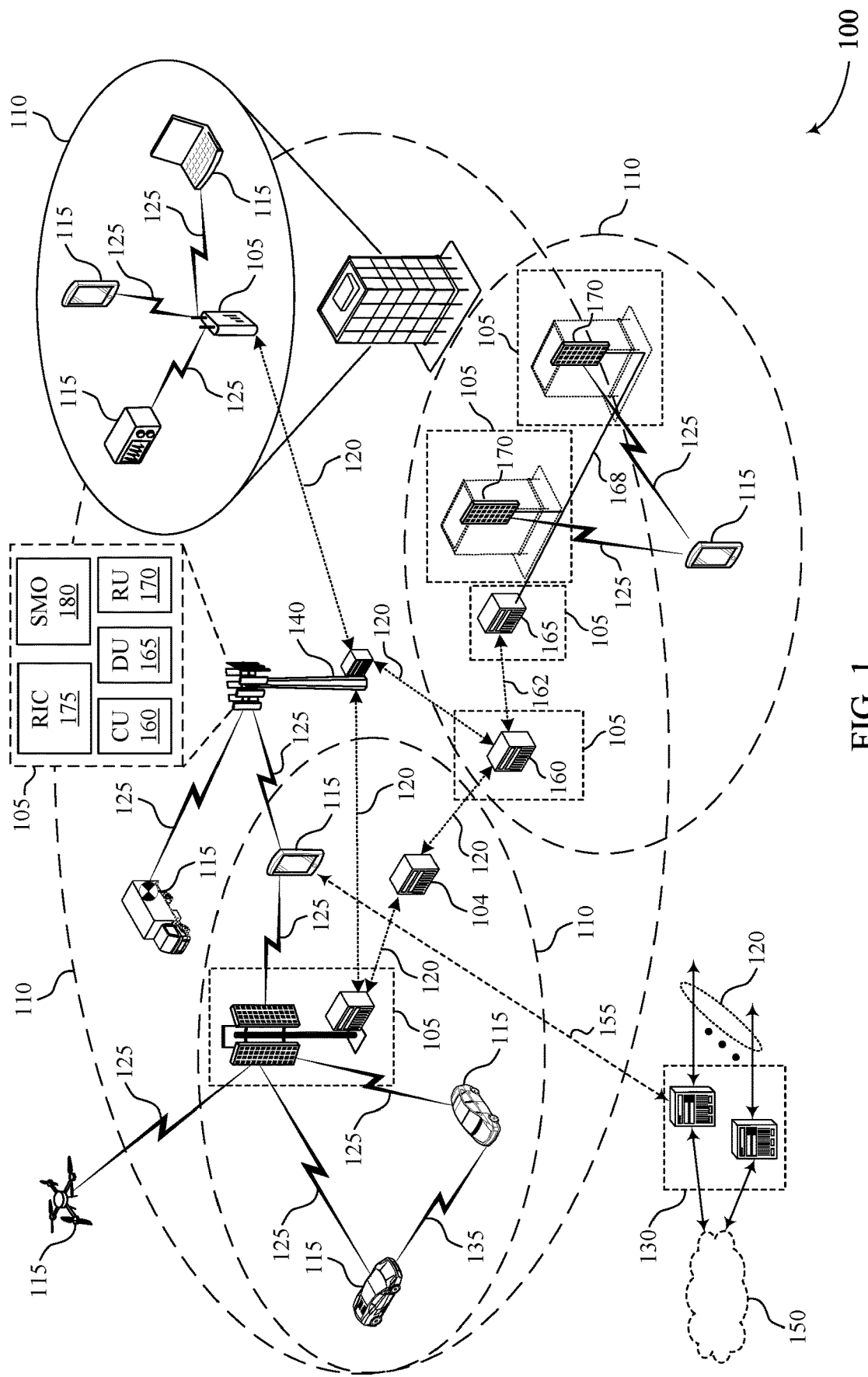
FIG. 1 illustrates an example of a wireless communications system that supports multi-path beam failure reporting techniques in accordance with one or more aspects of the present disclosure.

FIG. 1 illustrates an example of a wireless communications system 100 that supports multi-path beam failure reporting techniques in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support multi-path beam failure reporting techniques as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity

105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

The wireless communications system 100 may support multipath communications such that a first UE 115 may be connected to both a relay UE 115 and a network entity 105, where the first UE 115 to network entity 105 communications may be transmitted through a direct Uu link (e.g., access link) and/or via a relay link with the relay UE 115. These techniques may support increased link diversity and improved reliability. Additionally, as described herein, the wireless communications system 100 may support use of beamforming for communications between various devices (e.g., network entities 105 and UEs 115). Legacy beam failure detection and recovery procedures may specify that a UE 115 to signal a network entity either via a BFR communicated in a RACH of a primary cell or a BFR communicated in a scheduling request via a secondary cell. However, scheduling a BFR via RACH and/or SR may consume significant power resources and may increase latency.

Techniques described herein support leveraging a multipath scenario for beam failure detection and recovery. For example, a first UE 115 may use a sidelink to relay a beam condition report to a relay UE 115, where the relay UE 115 forwards the beam condition report to a network entity 110. The network entity 110 may transmit control signaling to configure the first UE 115 to monitor a condition of a beam used for communications between the first UE 115 and the network entity 110. The control signaling may also configure the first UE 115 to transmit a beam condition report via a sidelink channel to a relay UE 115, via the access link, or both. The network entity 110 may similarly configure the relay UE 115. Beneficially, the first UE 115 may utilize a sidelink and the relay UE 115 to forward a beam condition report that provides a redundant path to the network entity.

Figure 2:
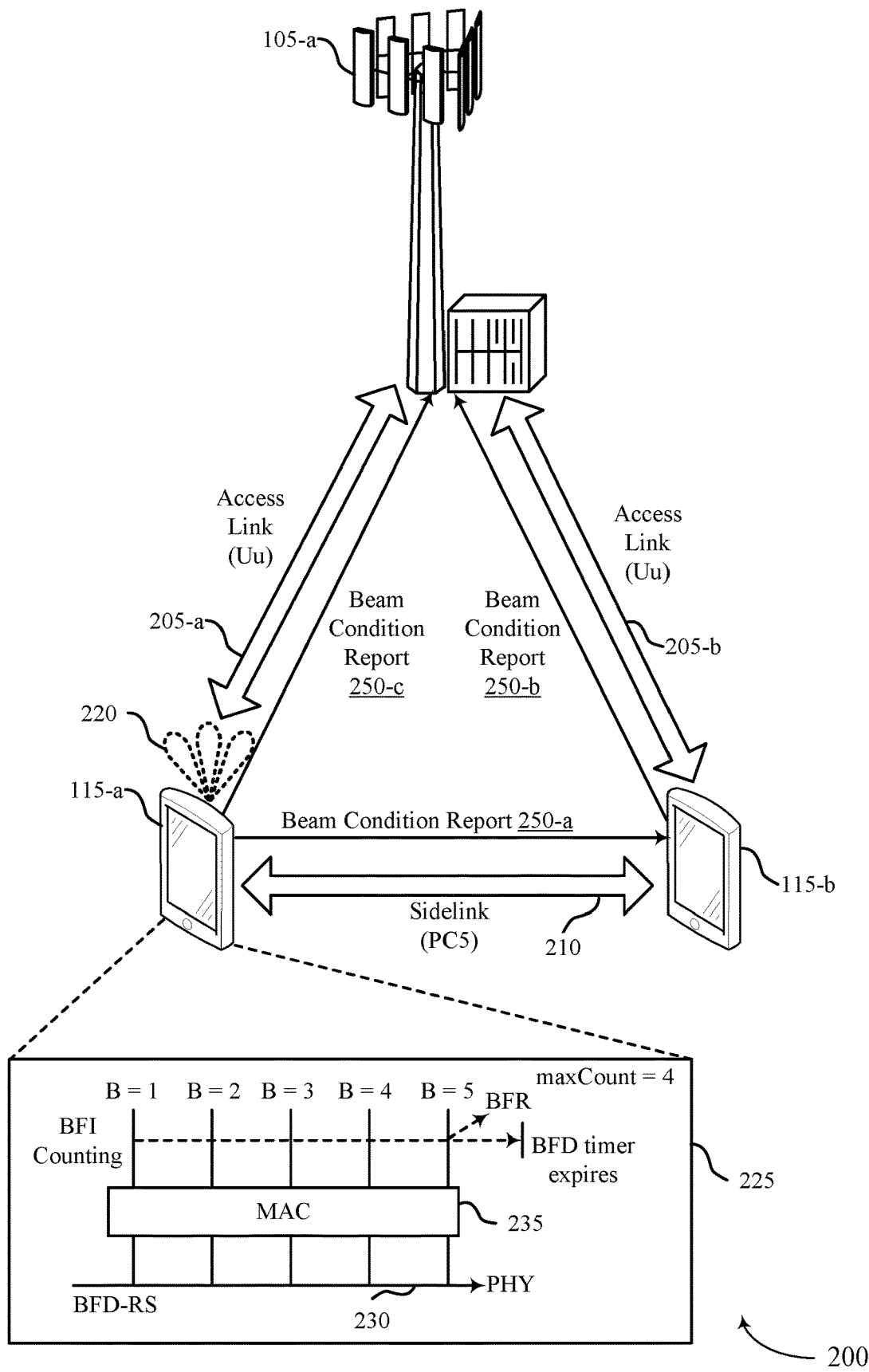
FIG. 2 illustrates an example of a wireless communications system that supports multi-path beam failure reporting techniques in accordance with one or more aspects of the present disclosure.

FIG. 2 illustrates an example of a wireless communications system 200 that supports multi-path beam failure reporting techniques in accordance with one or more aspects of the present disclosure. In some examples, the wireless communications system 200 may implement or include aspects of the wireless communications system 100. For example, the wireless communications system 200 may include a network entity 105-a, a UE 115-a, and a UE 115-b. The network entity 105-a may be an example of a network entity 105, as described herein with reference to FIG. 1, and the UE 115-a and the UE 115-b may be examples of UEs 115, as described herein with reference to FIG. 1. The UE 115-a, the UE 115-b, and the network entity 105-a may wirelessly communicate using various communications links as described herein.

The wireless communications system 200 implements multipath communication techniques. For example, the UE 115-a may be connected to and communicate with both the network entity 105-a and the UE 115-b. In some examples, the UE 115-b may function as a relay UE for the UE 115-a, and as such, the UE 115-a may communicate with the network entity 105-a via an access link 205-a (e.g., a direct or Uu link) and/or via a sidelink 210 (e.g., a PC5 interface link or a relay link). In using sidelink 210 for relaying downlink communications, the UE 115-b may communicate a message received from the network entity 105-a via access link 205-b to the UE 115-a via the sidelink 210. In using sidelink 210 for relaying uplink communications, the UE 115-b may communicate a message received from the UE 115-a via the sidelink 210 to the network entity 105-a using the access link 205-b. Additionally or alternatively, the UE 115-a may communicate (e.g., downlink and uplink) with the network entity 105-a via the access link 205-a. The use of these various path for communication may increase link diversity, which may result in improved reliability in the wireless communications system 200.

Moreover, the devices of the wireless communications system 200 may support beamforming communications. For example, the UE 115-a may communicate with the network entity 105-a, the UE 115-b, or both using one or more beams (e.g., a beam 220). The network entity 105-a and the UE 115-b may also utilize various beams for communications. The devices may utilize various techniques to support use of beams for communications, such as beam measurements, reporting, etc. For example, the UE 115-a may implement a beam failure detection and recovery procedure 225. In a beam failure detection or recovery procedure, the UE 115-a may signal the network entity 105-a through a RACH for a PCell or primary secondary cell (PSCell) beam failure recovery or through a scheduling request for a SCell beam failure recovery. These schemes may be time and power consuming because the RACH and SR techniques may utilize multiple rounds of communications between the UE 115-a and the network entity 105-a.

As described, the UE 115-a may implement a beam failure detection and recovery procedure 225. For beam failure detection and recovery in a PCell, the UE 115-a may be configured with and may monitor periodic reference signals, such a beam failure detection reference signal (BFD-RS) on a physical (PHY) layer 230. The BFD-RS may be an example of a periodic channel state information RS (CSI-RS) or a synchronization signal block (SSB). The UE 115-a may measure a quality of each of the periodic BFD-RSs (e.g., at B=1, B=2, etc.). For each BFD-RS occasion, the UE 115-a may determine a beam failure instance (BFI) indicator. For example, the UE may estimate a block error rate (BLER) using the BFD-RS and compare the BLER to a threshold. If the BLER is greater than the threshold, then the UE may determine a BFI. If the BLER is not greater than the threshold (e.g., less than or equal to the threshold), then the UE 115-a may not determine the BFI. Upon determining a BFI (e.g., BLER>threshold), then UE may initiate a BFD timer. As illustrated in beam failure detection and recovery procedure 225, the UE initiates a timer at B=1. With each subsequent indicator, a MAC layer 235 may increase a BFI count by 1. If the total BFI count reaches a maximum count (e.g., maxCount=4) before the BFD timer expires, the UE 115-a may declare a beam failure and initiate a BFR procedure. Else, if the BFD timer expires before the total BFI count reaches the maximum count threshold, the UE does not declare a beam failure, the BFI count is reset to 0, and the BFD timer is reset. As illustrated in FIG. 2, the BFI count reaches the maxCount at B=5, and as such, the UE 115-a may initiate the BFR procedure (e.g., via RACH or SR)

Techniques described herein support leveraging multipath scenarios for beam failure detection and recovery. Such techniques may support limited use of the RACH or SR for beam failure recovery. The described techniques include configurations for the UE 115-a and a relay UE (e.g., UE 115-b), signaling techniques, among other techniques. As such, the described techniques may support improved utilization of power and time resources, among other benefits. For example, according to techniques described herein the UE 115-a may signal a beam failure reporting (e.g., a beam condition report 250) to the network entity 105-a through the access link 205-a, the sidelink 210 (e.g., relay link), or both. The beam condition reporting may be transmitted before declaration of a beam failure and may serve as a warning for potential beam failure, and the network entity 105 may proactively refine a communication beam when receiving such a report. The beam condition report may specify conditions associated with one or beams, such as channel qualities, received powers, etc. In some examples, the beam condition report may indicate a beam failure (e.g., based on the beam failure recovery procedure 225). Thus, these techniques may support limited use of the RACH or SR.

In some examples, the UE 115-a may transmit the beam condition report 250 to the UE 115-b via the sidelink 210, to the network entity via the access link 205-a, or both, according to a beam condition reporting configuration. For example, the network may configure (e.g., via control signaling) the UE 115-a with the beam condition reporting configuration. The configuration may specify that the UE 115-a is to transmit a periodic beam failure condition report. For example, the UE 115-a may signal the beam condition report with a periodicity (f) according to the beam condition reporting configuration. Additionally or alternatively, the UE 115-a may be configured to transmit an aperiodic beam condition report to the UE. In such cases, the UE 115-a may use an event-based beam condition reporting mechanism. The conditions may be configured by the network entity 105-a and may include a number of (N) consecutive BFI recordings, a total BFI larger than a percentage (x %) of the maximum count (e.g., maxCount threshold), a sudden channel signal strength drop by threshold (y) decibels (dBs), etc. Other conditions for reporting a beam condition report are contemplated within the scope of the present disclosure. The configuration may also indicate whether the UE 115-a is to use the relay link (e.g., sidelink 210), the access link 205-*a*, or both for signaling the beam condition report (e.g., aperiodically or periodically).

The network entity 105-*a* may configure the UE 115-*a* with the beam condition reporting configuration (e.g., periodicity or triggering conditions) using RRC configuration. In some cases, multiple options of reporting periodicity and/or aperiodic reporting triggering conditions may be configured by the network entity 105-*a*, and the network entity 105-*a* may use MAC-CE or Downlink Control Information (DCI) signaling to indicate a selected configuration or to switch from one configuration to another. In some cases, the control signaling may indicates that the UE 115-*a* is to continue monitoring a same access link beam after the switch, to monitor a different access link beam after the switch, or to monitor both. These configurations and other techniques are described in further detail with respect to FIGS. 3A, 3B, and 4.

Figure 3A:
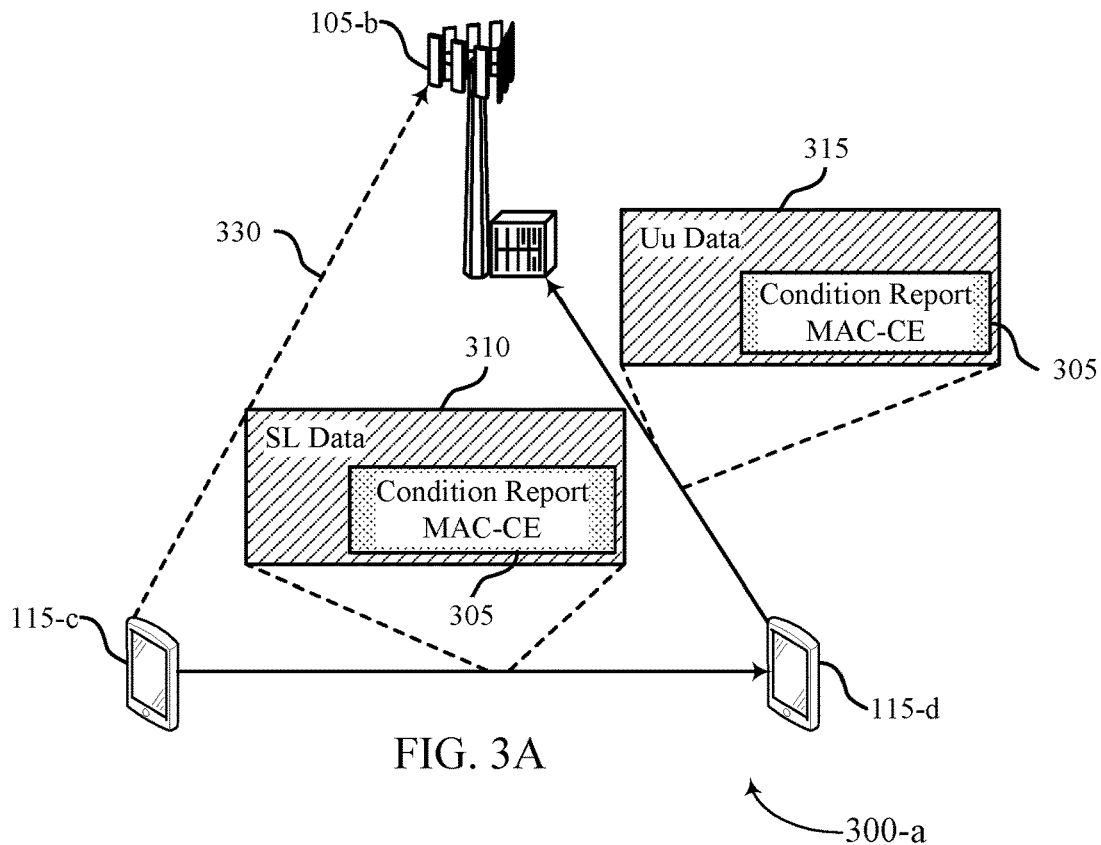
FIG. 3A and FIG. 3B illustrate examples of wireless communications systems that support multi-path beam failure reporting techniques in accordance with one or more aspects of the present disclosure.
Figure 3B:
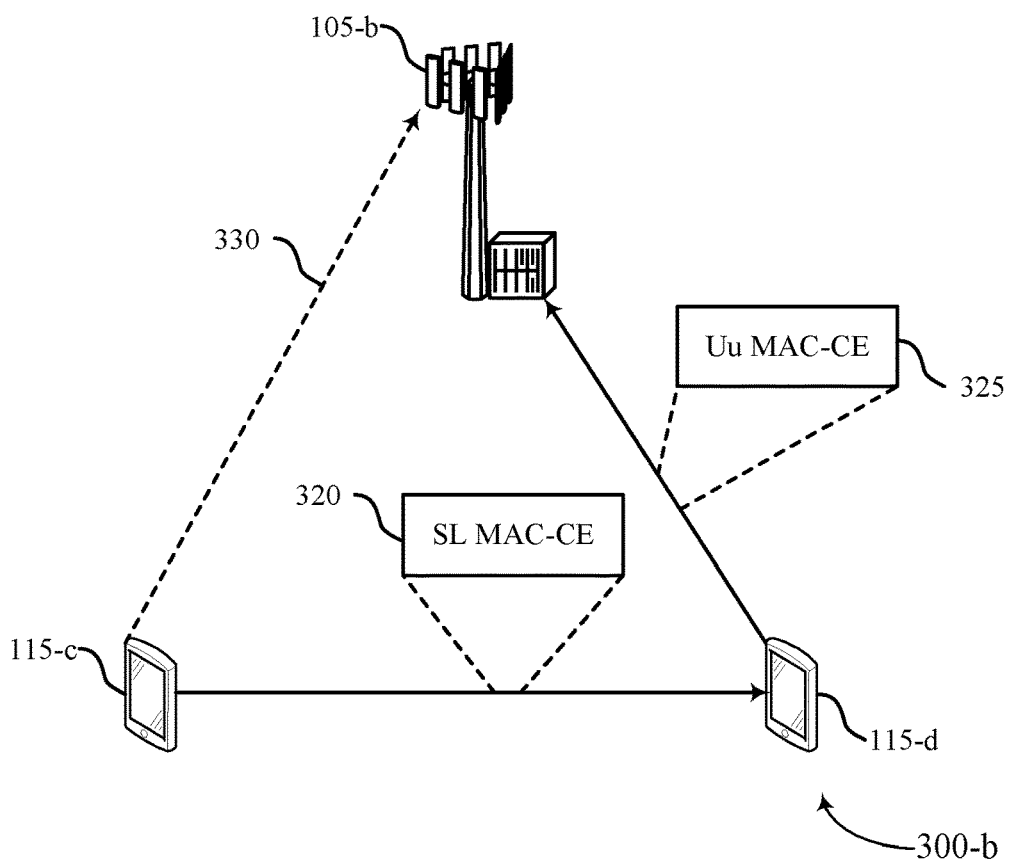

FIG. 3A and FIG. 3B illustrate examples of wireless communications systems 300 that support multi-path beam failure reporting techniques in accordance with one or more aspects of the present disclosure. The wireless communications systems 300-*a* and 300-*b* include a UE 115-*c* and a UE 115-*d*, which may be examples of UEs 115 described with respect to FIGS. 1 and 2. The wireless communications systems 300-*a* and 300-*b* include a network entity 105-*b*, which may be an example of a network entity 105 described with respect to FIGS. 1 and 2.

The wireless communications systems 300 may support utilization of a sidelink to report access link beam conditions. For example, the UE 115-*c* may detect an access link beam condition associated with the access link between the UE 115-*c* and the network entity 105-*b*. The access link beam condition may be detected according to techniques described with reference to FIG. 2 (e.g., based on a periodic configuration or based on an aperiodic condition). For example, the UE 115-*c* may transmit a beam condition report regarding the access link between the UE 115-*c* and the network entity 105-*b* to the UE 115-*d* (e.g., a relay UE) via a sidelink. The UE 115-*d* may transmit the beam condition report, received from the UE 115-*c*, to the network entity 105-*b* via an access link between the network entity 105-*b* and the UE 115-*d*. The wireless communications systems 300 illustrate example signaling techniques for transmitting the beam condition report between the UE 115-*c* and the UE 115-*d*, and between the UE 115-*d* and the network entity 105-*b*.

For example, in wireless communications system 300-*a*, the UE 115-*c* may transmit a MAC-CE 305, which is indicative of the beam condition report (e.g., a beam failure warning), in a sidelink data transmission 310 to the UE 115-*d*. More particularly, the MAC-CE is tunneled in the sidelink data. In such cases, the relay UE 115-*d* may decode the sidelink data transmission 310 and extract the MAC-CE 305. The UE 115-*d* may then tunnel the MAC-CE 305 using a access link data transmission 315 to the network entity 105-*b*. The network entity 105-*b* may decode the access link data transmission 315 and extract the MAC-CE 305 that is indicative of the beam condition report.

In wireless communications system 300-*b*, the UE 115-*d* may transmit a sidelink MAC-CE 320 that includes the beam condition report over the sidelink between the UE 115-*c* and the UE 115-*d*. The UE 115-*d* may decode the sidelink MAC-CE 320 and determine that the UE 115-*d* is to relay the sidelink MAC-CE 320 to the network entity 105-*b*. The relay UE 115-*d* may then transmit an access link MAC-CE 325 to the network entity 105-*b* to indicate the beam condition report. The network entity 105-*b* may decode the access link MAC-CE 325 and extract the MAC-CE 305 that is indicative of the beam condition report. The sidelink MAC-CE 320 may be configured for reporting the access link beam condition detected for the access link between the transmitting UE (e.g., the UE 115-*c*) and the network entity 105-*b*. As such, the sidelink MAC-CE 320 may indicate the beam condition reporting information for the access link between the UE 115-*c* and the network entity 105-*b* and may contain information such as an identifier for the UE 115-*c*. As such, the relay UE 115-*d* and the network entity 105-*b* may be able to identify the source for the beam condition report and/or the subject of the report.

Further, the access link MAC-CE 325 may contain the identifier for the UE 115-*c* such that the network entity 105-*b* may identify the source or subject of the beam condition report. In some examples, the access link MAC-CE 325 contains a beam condition reporting information or beam failure report information associated with the access link between the network entity 105-*d* and the UE 115-*d* and detected by the UE 115-*d*. In such cases, the UE 115-*d* may indicate (e.g., via a flag or field) whether the access link MAC-CE 325 is associated with the UE 115-*c* or that the UE 115-*d* is transmitting the beam condition report for itself (e.g., the UE 115-*d*).

In some examples, the UE 115-*c* may transmit the beam condition report to the network entity 105-*b* via the access link as shown in signaling 330. In a first option, the UE 115-*c* may transmit the beam condition report via an access link MAC-CE message (e.g., similar to the access link MAC-CE 325 of FIG. 3B) or using uplink control information (UCI). In some examples, the beam condition report is transmitted via the access link (e.g., signaling 330) in addition to the beam condition report being transmitted via the sidelink (e.g., via the tunneled MAC-CE 305 or via the sidelink MAC-CE 320). Thus, this technique may be used in addition to the relaying technique to increase diversity and reliability.

As described herein, the UEs 115-*c* and UE 115-*d* may be configured with techniques for detecting, transmitting, and/or relaying beam condition reports. For example, the network entity 105-*b* may use RRC signaling to configure a signaling method (e.g., using the technique illustrated in FIG. 3A, the technique illustrated in FIG. 3B and/or using the access link signaling 330). Multiple reporting methods may be configured at the UEs 115. In such cases, the network entity may use MAC-CE or DCI to switch configurations (e.g., via a configuration index).

In some cases, the signaling technique may be selected based on various criteria. For example, the UE 115-*c* may select a signaling technique based on a link quality on the access link and/or the sidelink. For example, if the access link quality is less than the relay link quality, then the UE 115-*c* may determine to use one of the sidelink/relaying techniques illustrated in FIGS. 3A and 3B. If the access link quality is greater than the relay link quality, then the UE 115-*c* may determine to use the access link signaling 330 to indicate the beam report condition. The UE 115-*c* may additionally or alternatively consider a quality of service conditions of the serving traffic. For example, if the quality of service condition for traffic communicated via the access link is relatively high (e.g., at or exceeds a quality of service threshold), then the UE 115-*c* may determine to use both the sidelink reporting technique illustrated in FIG. 3A or 3B and the access link signaling 320 to transmit the beam condition report.

In some examples, the network entity 105-*b* may activate or deactivate beam condition reporting as described herein.

In a downlink based activation/deactivation technique, the network entity 105-b may send an activation or deactivation signal to the UE 115-c using MAC-CE or DCI signaling. In an uplink based activation/deactivation technique, the UE 115-a may transmit an activation/deactivation request to the network entity 105-b using MAC-CE or UCI, and the UE 115-c may await for a response from the network entity 105-b to approve or deny the request (e.g., activate/deactivate or not). The UE 115-c and/or the network entity 105-b may use various factors to determine whether to activate or deactivate beam condition reporting. The factors may include quality of service conditions for serving traffic, power constraints at the source and/or relay UE, capacity constraints at the source and/or relay UE, capability constraints at the source and/or relay UE, or any combination thereof.

It should be understood that the various signaling techniques described herein with reference to FIG. 3A or 3B may be combined or arranged in different configurations as shown. As described herein, because the UE 115-c may send the beam condition report before declaration of the beam failure, the UE 115-c may avoid or limit using the RACH/SR procedures that are associated with increased latency and power consumption. Further, the beam condition report may function as a beam status report for the UE 115-c, and the network entity 105-b may perform beam refinement procedures based on the report. As such, these techniques may improve quality of service and improve beam reliability.

Figure 4:
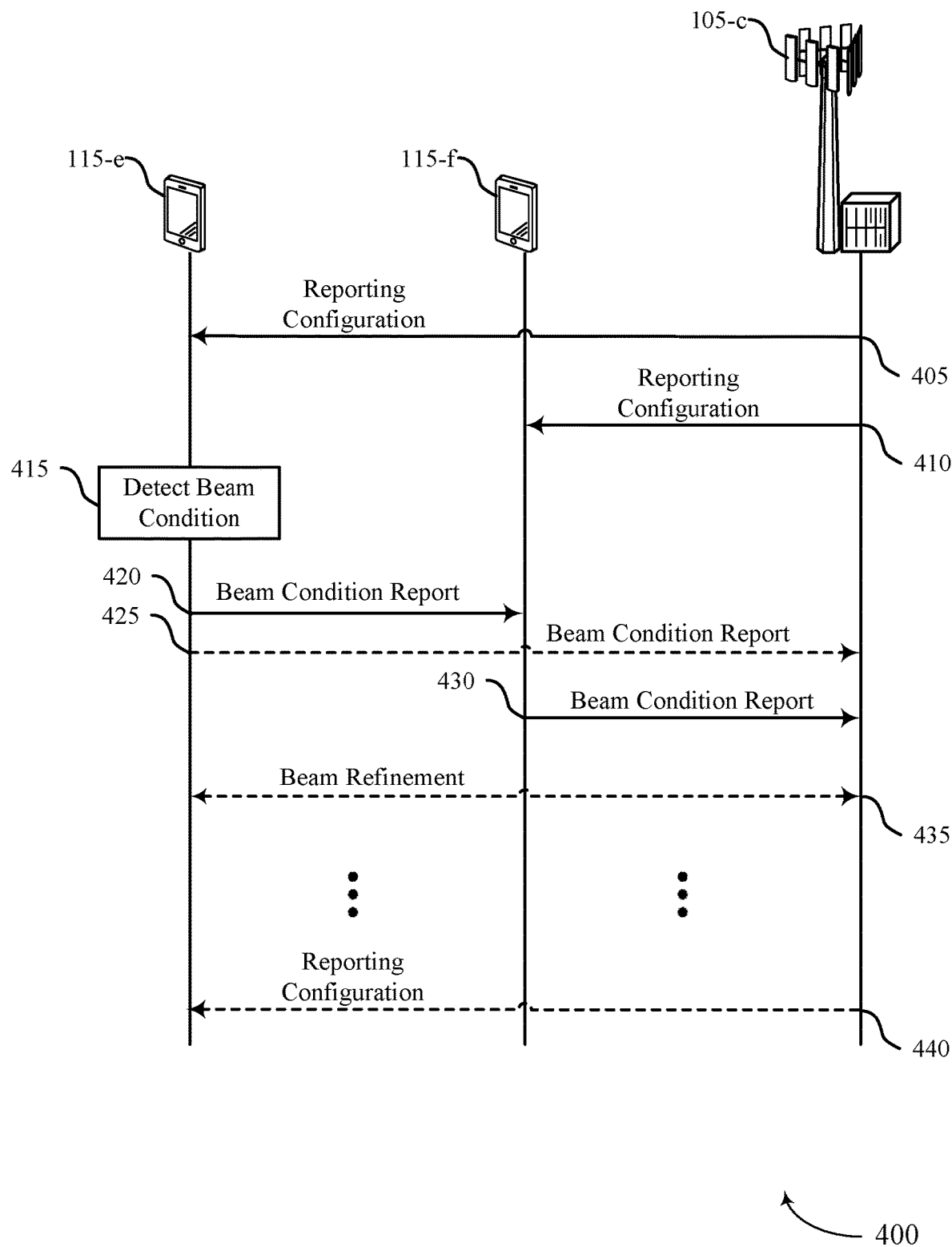
FIG. 4 illustrates an example of a process flow that supports multi-path beam failure reporting techniques in accordance with one or more aspects of the present disclosure.

FIG. 4 illustrates an example of a process flow 400 that supports multi-path beam failure reporting techniques in accordance with one or more aspects of the present disclosure. The process flow 400 include a UEs 115-e and a UE 115-$f_{max}$, which may be examples of UEs 115 described with respect to FIGS. 1 through 3. The process flow 400 also includes a network entity 105-c, which may be an example of the network entities 105 described with respect to FIGS. 1 through 3. In the following description of the process flow 400, the operations between the UEs 115 and the network entity 105-c may be transmitted in a different order than the example order shown, or the operations performed by the UEs 115 and the network entity 105-c may be performed in different orders or at different times. Some operations may also be omitted from the process flow 400, and other operations may be added to the process flow 400.

At 405, the UE 115-e may receive, from the network entity 105-c via an access link, control signaling indicating a beam condition reporting configuration for reporting an access link beam condition to the network entity via a relay UE (e.g., the UE 115-f). The control signaling may include RRC signaling, MAC-CE signaling, DCI signaling, or any combination thereof. In some cases, the control signaling may activate or deactivate the reporting configurations. Further, the control signaling may indicate a one of a plurality of beam condition reporting configurations. In some examples, the control signaling indicates a periodic beam condition report configuration or an aperiodic or event-based beam condition reporting configuration. In the aperiodic configuration, the configuration may indicate a threshold number of consecutive BFI reporting's, a total BFIs larger than a percentage of threshold, a signal strength delta threshold, or some other condition. For example, the control signaling may indicate the beam condition reporting configuration that indicates an access link quality threshold associated with the access link beam condition. Additionally or alternatively, the control signaling may indicate the beam condition reporting configuration that indicates a quality of service threshold associated with access link data.

At 410, UE 115-f may receive, from the network entity 105-c via an access link, control signaling indicating a beam condition reporting configuration that indicates to relay a beam condition report from the first UE 115-e to the network entity 105-c. The control signaling may include RRC signaling, MAC-CE signaling, DCI signaling, or a combination thereof.

At 415, the UE 115-e may detect the access link beam condition for the access link in accordance with the beam condition reporting configuration. The access link beam condition may be detected based on a periodic reporting configuration or satisfaction of an aperiodic triggering condition.

At 420, the UE 115-e may transmit via a sidelink to the relay UE 115-f, a beam condition report to the relay UE 115-f that indicates to relay the beam condition report to the network entity. The beam condition report may be transmitted via a MAC-CE (e.g., an access link MAC-CE) tunneled in sidelink data, via a sidelink MAC-CE, or via another sidelink signaling technique. The indication to relay may be based on the type of signaling used (e.g., tunneled MAC-CE, sidelink MAC-CE) or content of the signaling (e.g., a flag or an identifier of the UE 115-e).

At 425, the UE 115-e may transmit, via the access link, the beam condition report to the network entity 105-c. The beam condition report may be transmitted via UCI or a MAC-CE. Thus, in some examples, the UE 115-e may transmit the beam condition report to the network entity via the access link and to the relay UE via the sidelink.

At 430, the UE 115-f may transmit, via the access link between the UE 115-f and the network entity 105-c, the beam condition report to the network entity 105-c in accordance with the beam condition reporting configuration received from the network entity 105-c.

At 435, the UE 115-e and/or the network entity 105-c may exchange communications and perform procedures to refine the communication beam. For example, Based on the beam condition report, the network entity may perform various a beam refinement techniques technique, such as a beam switch, (e.g., switch beams) for communications with the UE 115-e.

At 435, the UE 115-f may receive control signaling indicating to switch from the beam condition reporting configuration to a second beam condition reporting configuration. The new configuration may be used on the same beam on which the initial reporting configuration was used.

Figure 5:
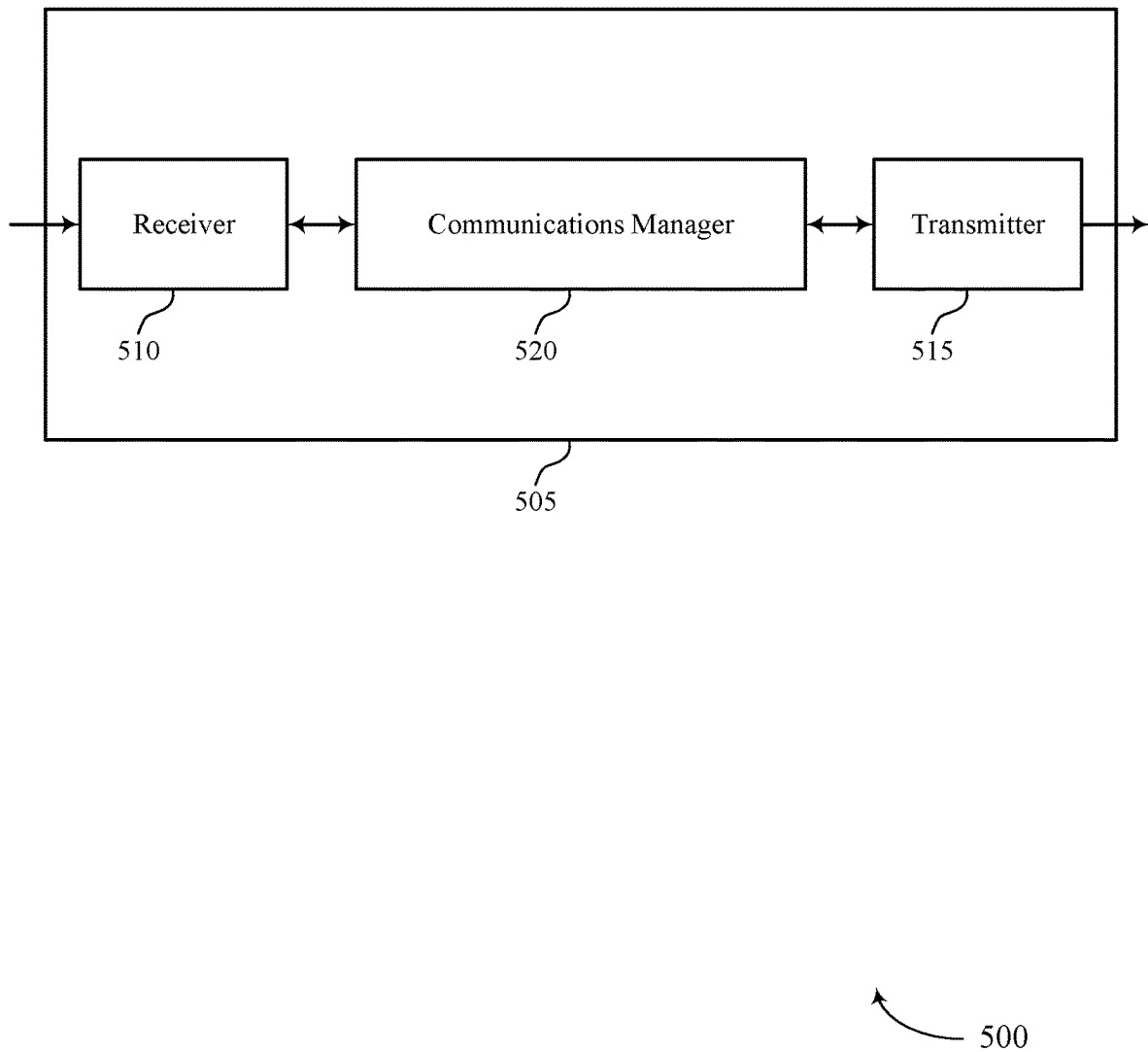
FIGS. 5 and 6 show block diagrams of devices that support multi-path beam failure reporting techniques in accordance with one or more aspects of the present disclosure.

FIG. 5 shows a block diagram 500 of a device 505 that supports multi-path beam failure reporting techniques in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to multi-path beam failure reporting techniques). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to multi-path beam failure reporting techniques). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of multi-path beam failure reporting techniques as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving, from a network entity via an access link, control signaling indicating a beam condition reporting configuration for reporting an access link beam condition to the network entity via a relay UE. The communications manager 520 may be configured as or otherwise support a means for detecting the access link beam condition for the access link in accordance with the beam condition reporting configuration. The communications manager 520 may be configured as or otherwise support a means for transmitting, via a sidelink to the relay UE, a beam condition report to the relay UE that indicates to relay the beam condition report to the network entity.

Additionally, or alternatively, the communications manager 520 may support wireless communication at a relay UE in accordance with examples as disclosed herein. For example, the communications manager 520 may be configured as or otherwise support a means for receiving, from a network entity via an access link, control signaling indicating a beam condition reporting configuration that indicates to relay a beam condition report from a first UE to the network entity. The communications manager 520 may be configured as or otherwise support a means for receiving, via a sidelink from the first UE, a beam condition report that indicates an access link beam condition between the first UE and the network entity. The communications manager 520 may be configured as or otherwise support a means for transmitting, via the access link, the beam condition report to the network entity in accordance with the beam condition reporting configuration.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced processing and power consumption due to limited use of RACH procedures or SR for reporting beam failures.

Figure 6:
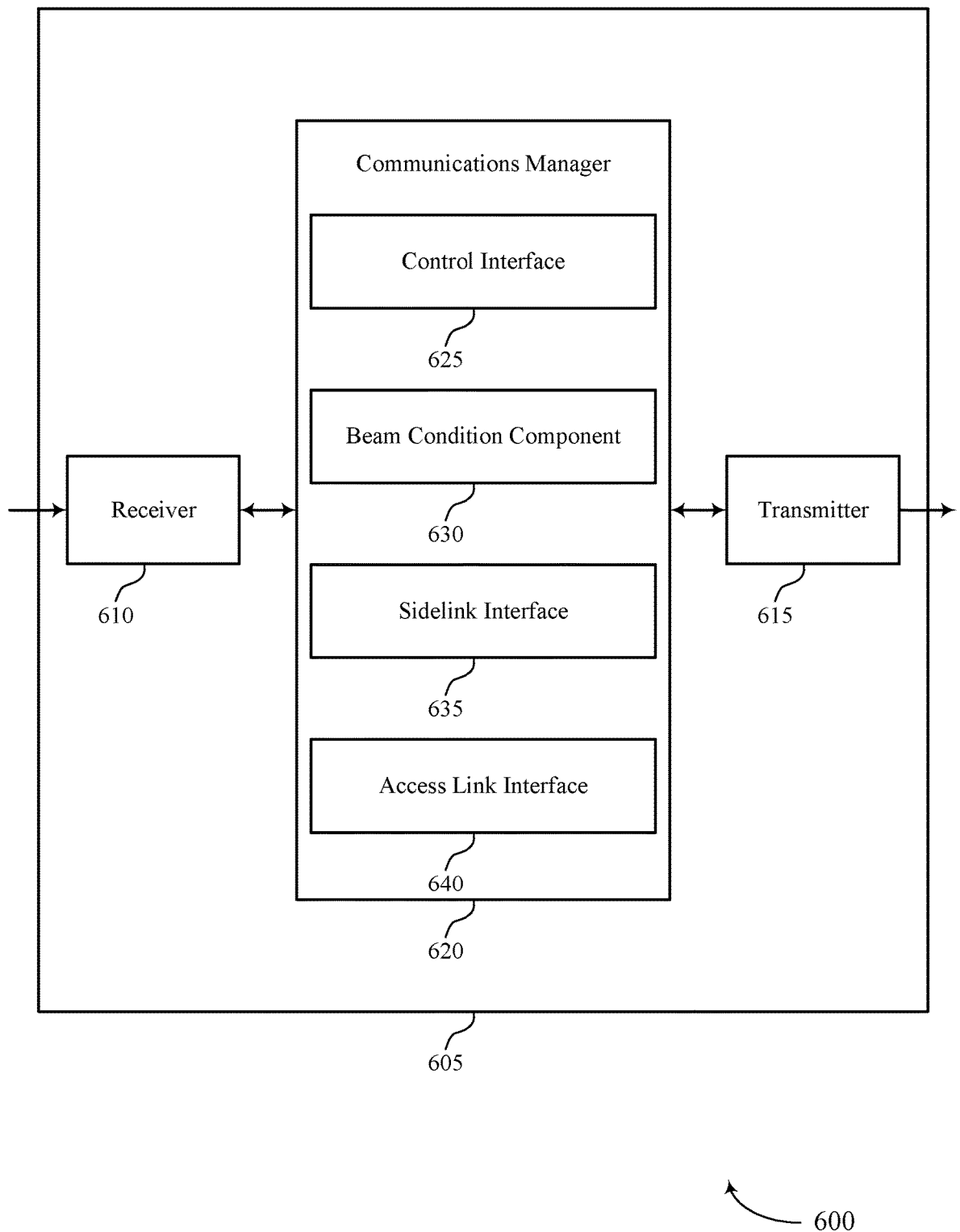

FIG. 6 shows a block diagram 600 of a device 605 that supports multi-path beam failure reporting techniques in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to multi-path beam failure reporting techniques). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to multi-path beam failure reporting techniques). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of multi-path beam failure reporting techniques as described herein. For example, the communications manager 620 may include a control interface 625, a beam condition component 630, a sidelink interface 635, an access link interface 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The control interface 625 may be configured as or otherwise support a means for receiving, from a network entity via an access link, control signaling indicating a beam condition reporting configuration for reporting an access link beam condition to the network entity via a relay UE. The beam condition component 630 may be configured as or otherwise support a means for detecting the access link beam condition for the access link in accordance with the beam condition reporting configuration. The sidelink interface 635 may be configured as or otherwise support a means for transmitting, via a sidelink to the relay UE, a beam condition report to the relay UE that indicates to relay the beam condition report to the network entity.

Additionally, or alternatively, the communications manager 620 may support wireless communication at a relay UE in accordance with examples as disclosed herein. The control interface 625 may be configured as or otherwise support a means for receiving, from a network entity via an access link, control signaling indicating a beam condition reporting configuration that indicates to relay a beam condition report from a first UE to the network entity. The sidelink interface 635 may be configured as or otherwise support a means for receiving, via a sidelink from the first UE, a beam condition report that indicates an access link beam condition between the first UE and the network entity. The access link interface 640 may be configured as or otherwise support a means for transmitting, via the access link, the beam condition report to the network entity in accordance with the beam condition reporting configuration.

Figure 7:
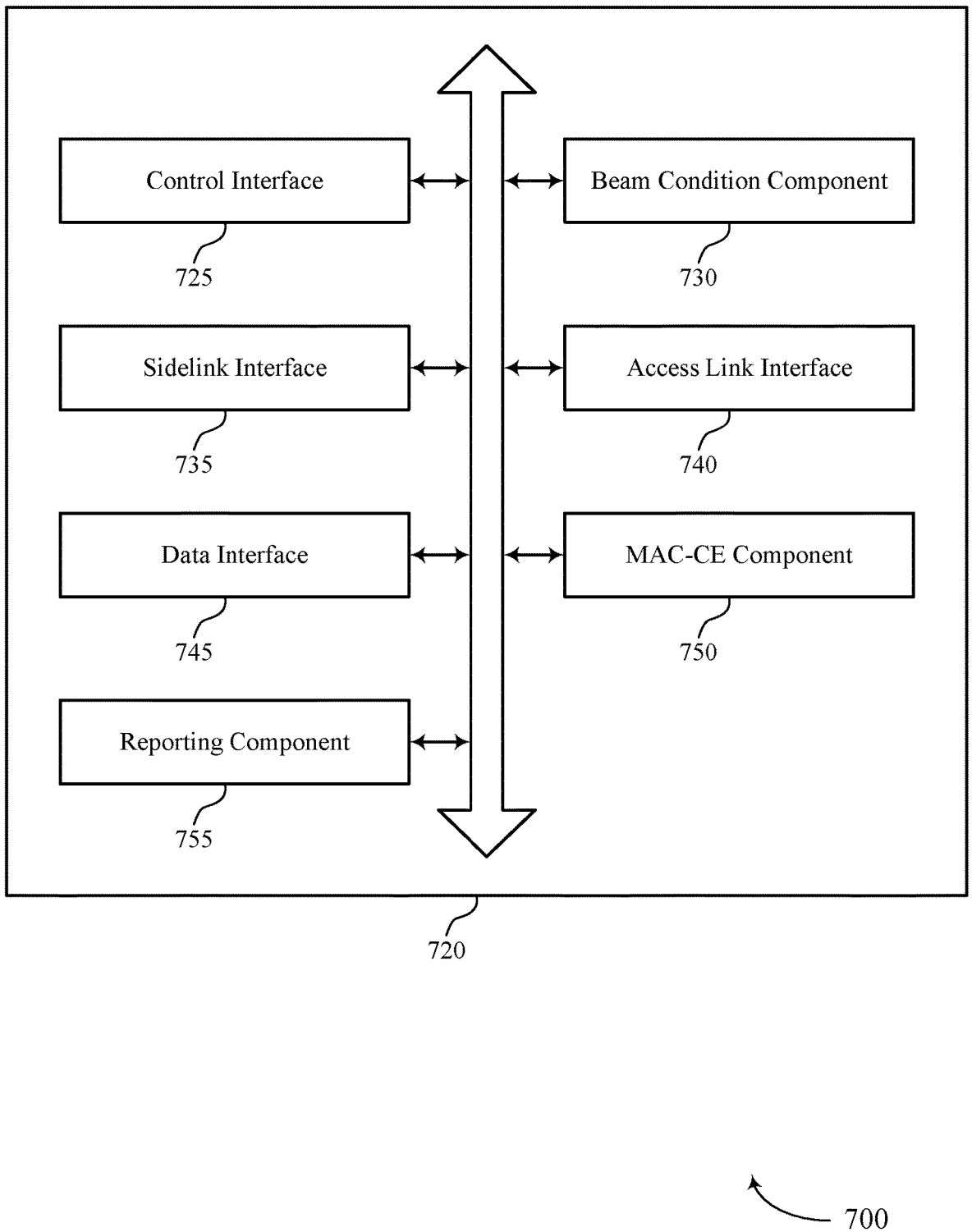
FIG. 7 shows a block diagram of a communications manager that supports multi-path beam failure reporting techniques in accordance with one or more aspects of the present disclosure.

FIG. 7 shows a block diagram 700 of a communications manager 720 that supports multi-path beam failure reporting techniques in accordance with one or more aspects of the present disclosure. The communications manager 720 may be an example of aspects of a communications manager 520, a communications manager 620, or both, as described herein. The communications manager 720, or various components thereof, may be an example of means for performing various aspects of multi-path beam failure reporting techniques as described herein. For example, the communications manager 720 may include a control interface 725, a beam condition component 730, a sidelink interface 735, an access link interface 740, a data interface 745, a MAC-CE component 750, a reporting component 755, or any combination thereof. Each of these components may communicate, directly or indirectly, with one another (e.g., via one or more buses).

The communications manager 720 may support wireless communication at a UE in accordance with examples as disclosed herein. The control interface 725 may be configured as or otherwise support a means for receiving, from a network entity via an access link, control signaling indicating a beam condition reporting configuration for reporting an access link beam condition to the network entity via a relay UE. The beam condition component 730 may be configured as or otherwise support a means for detecting the access link beam condition for the access link in accordance with the beam condition reporting configuration. The sidelink interface 735 may be configured as or otherwise support a means for transmitting, via a sidelink to the relay UE, a beam condition report to the relay UE that indicates to relay the beam condition report to the network entity.

In some examples, the data interface 745 may be configured as or otherwise support a means for transmitting sidelink data including the beam condition report to the relay UE.

In some examples, the MAC-CE component 750 may be configured as or otherwise support a means for transmitting, to the relay UE via the sidelink, an access link medium access control control element tunneled in sidelink data including the beam condition report.

In some examples, the MAC-CE component 750 may be configured as or otherwise support a means for transmitting a sidelink medium access control control element including the beam condition report to the relay UE.

In some examples, the access link interface 740 may be configured as or otherwise support a means for transmitting, via the access link, the beam condition report to the network entity.

In some examples, the access link interface 740 may be configured as or otherwise support a means for transmitting, to the network entity, uplink control information or a medium access control control element including the beam condition report.

In some examples, the reporting component 755 may be configured as or otherwise support a means for transmitting the beam condition report to the network entity via the access link and to the relay UE via the sidelink.

In some examples, to support receiving the control signaling, the control interface 725 may be configured as or otherwise support a means for receiving the control signaling indicating the beam condition reporting configuration from a set of multiple different beam condition reporting configurations.

In some examples, the control interface 725 may be configured as or otherwise support a means for receiving radio resource control signaling indicating a set of multiple different beam condition reporting configurations including the beam condition reporting configuration.

In some examples, the control interface 725 may be configured as or otherwise support a means for receiving second control signaling indicating to switch from the beam condition reporting configuration to a second beam condition reporting configuration, wherein the second beam condition reporting configuration indicates to monitor a same access link beam as the beam condition reporting configuration or a different access link beam than the beam condition reporting configuration. In some examples, the beam condition component 730 may be configured as or otherwise support a means for detecting a second access link beam condition for the access link in accordance with the second beam condition reporting configuration. In some examples, the sidelink interface 735 may be configured as or otherwise support a means for transmitting, via the sidelink to the relay UE, a second beam condition report that indicates to relay the second beam condition report to the network entity.

In some examples, the control interface 725 may be configured as or otherwise support a means for receiving downlink control information or a medium access control control element indicating switch from the beam condition reporting configuration to a second beam condition reporting configuration.

In some examples, to support receiving the control signaling, the control interface 725 may be configured as or otherwise support a means for receiving the control signaling that indicates the beam condition reporting configuration that indicates an access link quality threshold associated with the access link beam condition, where the beam condition report is transmitted based on the access link beam condition satisfying the access link quality threshold.

In some examples, to support receiving the control signaling, the control interface 725 may be configured as or otherwise support a means for receiving the control signaling that indicates the beam condition reporting configuration that indicates a quality of service threshold associated with access link data, where the beam condition report is transmitted based on the access link beam condition satisfying quality of service threshold.

In some examples, to support receiving the control signaling, the control interface 725 may be configured as or otherwise support a means for receiving a control message that indicates activation or deactivation of the beam condition reporting configuration.

In some examples, the control interface 725 may be configured as or otherwise support a means for transmitting a control message that requests activation of the beam condition reporting configuration, where the control signaling is received in response to the control message.

In some examples, the control interface 725 may be configured as or otherwise support a means for transmitting a control message that requests deactivation of the beam condition reporting configuration.

Additionally, or alternatively, the communications manager 720 may support wireless communication at a relay UE in accordance with examples as disclosed herein. In some examples, the control interface 725 may be configured as or otherwise support a means for receiving, from a network entity via an access link, control signaling indicating a beam condition reporting configuration that indicates to relay a beam condition report from a first UE to the network entity. In some examples, the sidelink interface 735 may be configured as or otherwise support a means for receiving, via a sidelink from the first UE, a beam condition report that indicates an access link beam condition between the first UE and the network entity. The access link interface 740 may be configured as or otherwise support a means for transmitting, via the access link, the beam condition report to the network entity in accordance with the beam condition reporting configuration.

In some examples, the data interface 745 may be configured as or otherwise support a means for receiving, via the sidelink, sidelink data including the beam condition report.

In some examples, the access link interface 740 may be configured as or otherwise support a means for receiving, via the sidelink, an access link medium access control control element tunneled in sidelink data including the beam condition report.

In some examples, the MAC-CE component 750 may be configured as or otherwise support a means for receiving a sidelink medium access control control element including the beam condition report.

Figure 8:
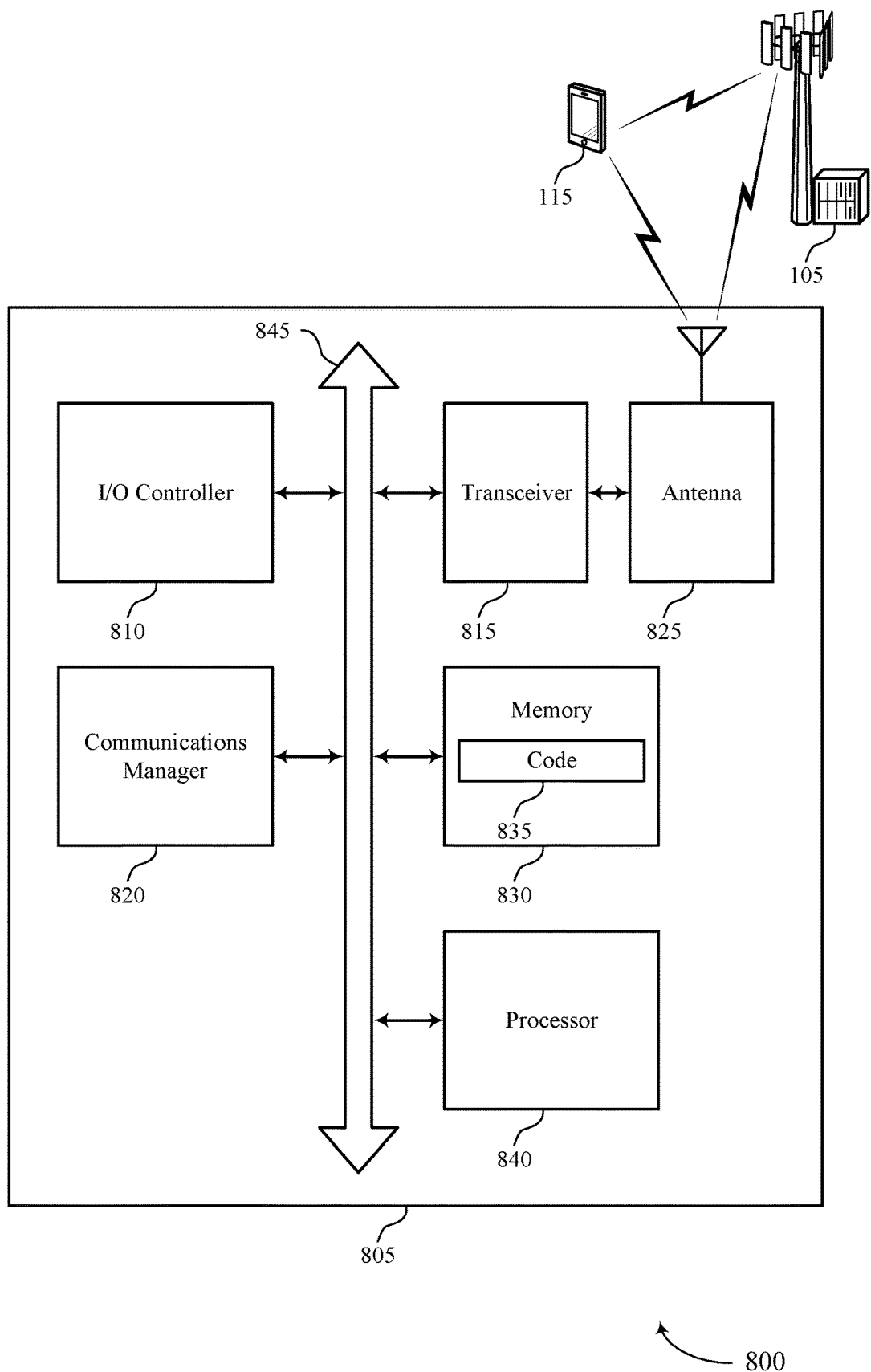
FIG. 8 shows a diagram of a system including a device that supports multi-path beam failure reporting techniques in accordance with one or more aspects of the present disclosure.

FIG. 8 shows a diagram of a system 800 including a device 805 that supports multi-path beam failure reporting techniques in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting multipath beam failure reporting techniques). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a network entity via an access link, control signaling indicating a beam condition reporting configuration for reporting an access link beam condition to the network entity via a relay UE. The communications manager 820 may be configured as or otherwise support a means for detecting the access link beam condition for the access link in accordance with the beam condition reporting configuration. The communications manager 820 may be configured as or otherwise support a means for transmitting, via a sidelink to the relay UE, a beam condition report to the relay UE that indicates to relay the beam condition report to the network entity.

Additionally, or alternatively, the communications manager 820 may support wireless communication at a relay UE in accordance with examples as disclosed herein. For example, the communications manager 820 may be configured as or otherwise support a means for receiving, from a network entity via an access link, control signaling indicating a beam condition reporting configuration that indicates to relay a beam condition report from a first UE to the network entity. The communications manager 820 may be configured as or otherwise support a means for receiving, via a sidelink from the first UE, a beam condition report that indicates an access link beam condition between the first UE and the network entity. The communications manager 820 may be configured as or otherwise support a means for transmitting, via the access link, the beam condition report to the network entity in accordance with the beam condition reporting configuration.

By including or configuring the communications manager 820 in accordance with examples as described herein, the device 805 may support techniques for improved communication reliability and improved user experience related to reduced power consumption due to limited use of RACH procedures or SR for reporting beam failures and increased diversity for beam condition reporting.

In some examples, the communications manager 820 may be configured to perform various operations (e.g., receiving, monitoring, transmitting) using or otherwise in cooperation with the transceiver 815, the one or more antennas 825, or any combination thereof. For example, the communications manager 820 may be configured to receive or transmit messages or other signaling as described herein via the transceiver 815. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of multi-path beam failure reporting techniques as described herein, or the processor 840 and the memory 830 may be otherwise configured to perform or support such operations.

Figure 9:
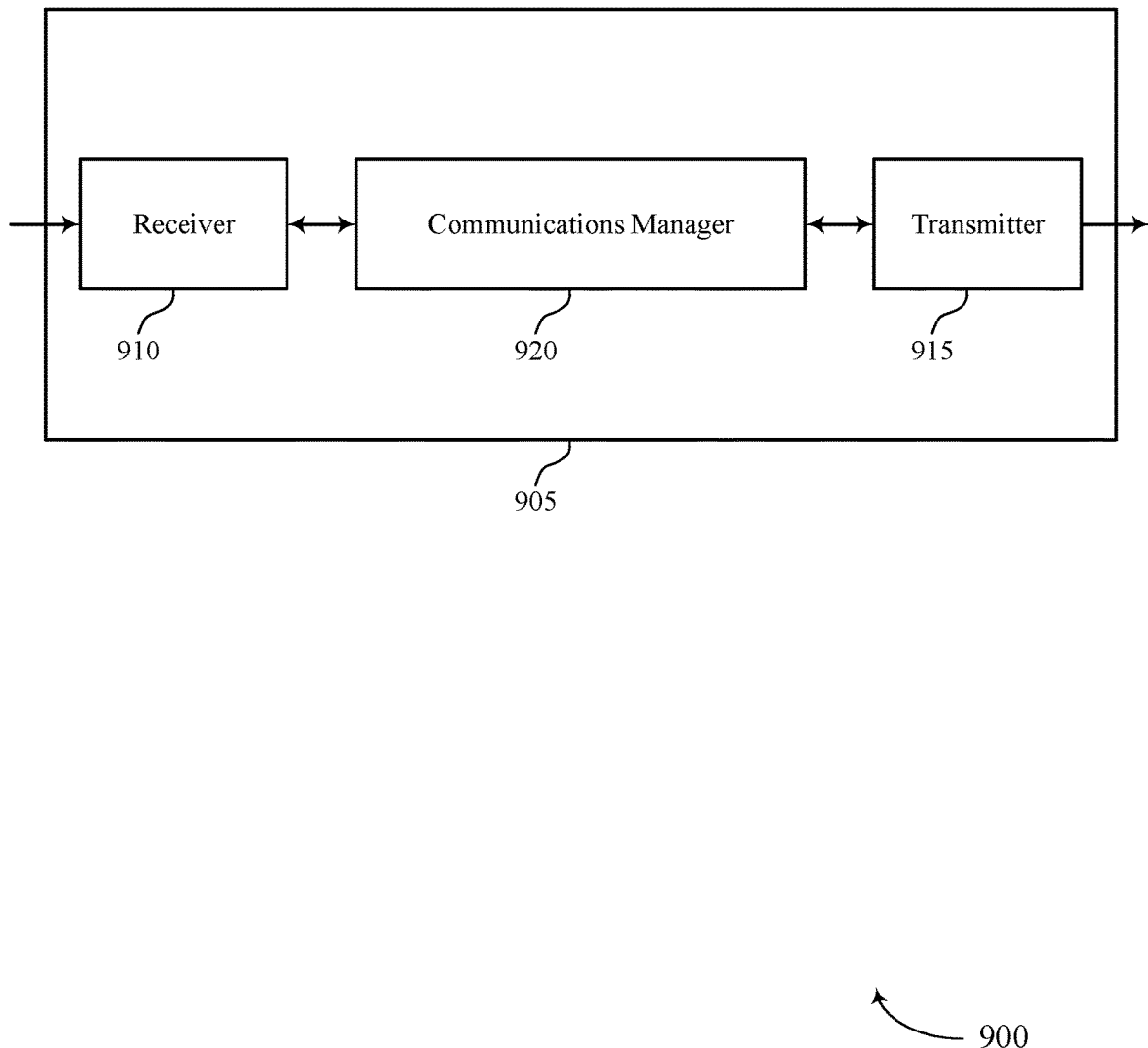
FIGS. 9 and 10 show block diagrams of devices that support multi-path beam failure reporting techniques in accordance with one or more aspects of the present disclosure.

FIG. 9 shows a block diagram 900 of a device 905 that supports multi-path beam failure reporting techniques in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of multi-path beam failure reporting techniques as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting, to a first UE via a first access link, first control signaling indicating a beam condition reporting configuration for reporting an access link beam condition to the network entity via a relay UE. The communications manager 920 may be configured as or otherwise support a means for transmitting, to a relay UE via a second access link, second control signaling indicating the beam condition reporting configuration that indicates to relay a beam condition report from the first UE to the network entity; and. The communications manager 920 may be configured as or otherwise support a means for receiving, from the relay UE via the second access link, the beam condition report of the first UE.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing and power consumption (e.g., longer battery life) due to limited use of RACH procedures or SR for reporting beam failures.

Figure 10:
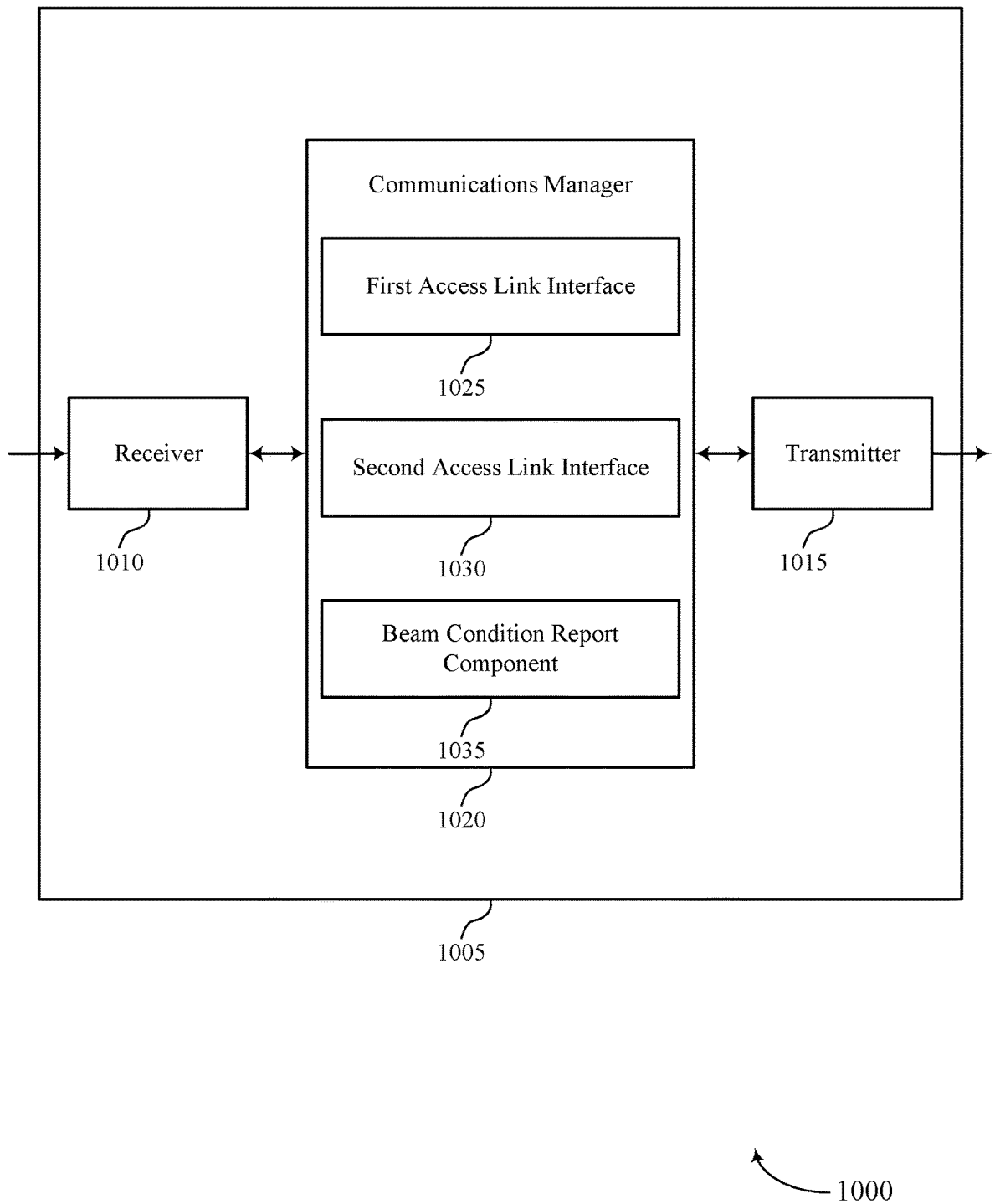

FIG. 10 shows a block diagram 1000 of a device 1005 that supports multi-path beam failure reporting techniques in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of multi-path beam failure reporting techniques as described herein. For example, the communications manager 1020 may include a first access link interface 1025, a second access link interface 1030, a beam condition report component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The first access link interface 1025 may be configured as or otherwise support a means for transmitting, to a first UE via a first access link, first control signaling indicating a beam condition reporting configuration for reporting an access link beam condition to the network entity via a relay UE. The second access link interface 1030 may be configured as or otherwise support a means for transmitting, to a relay UE via a second access link, second control signaling indicating the beam condition reporting configuration that indicates to relay a beam condition report from the first UE to the network entity; and. The beam condition report component 1035 may be configured as or otherwise support a means for receiving, from the relay UE via the second access link, the beam condition report of the first UE.

Figure 11:
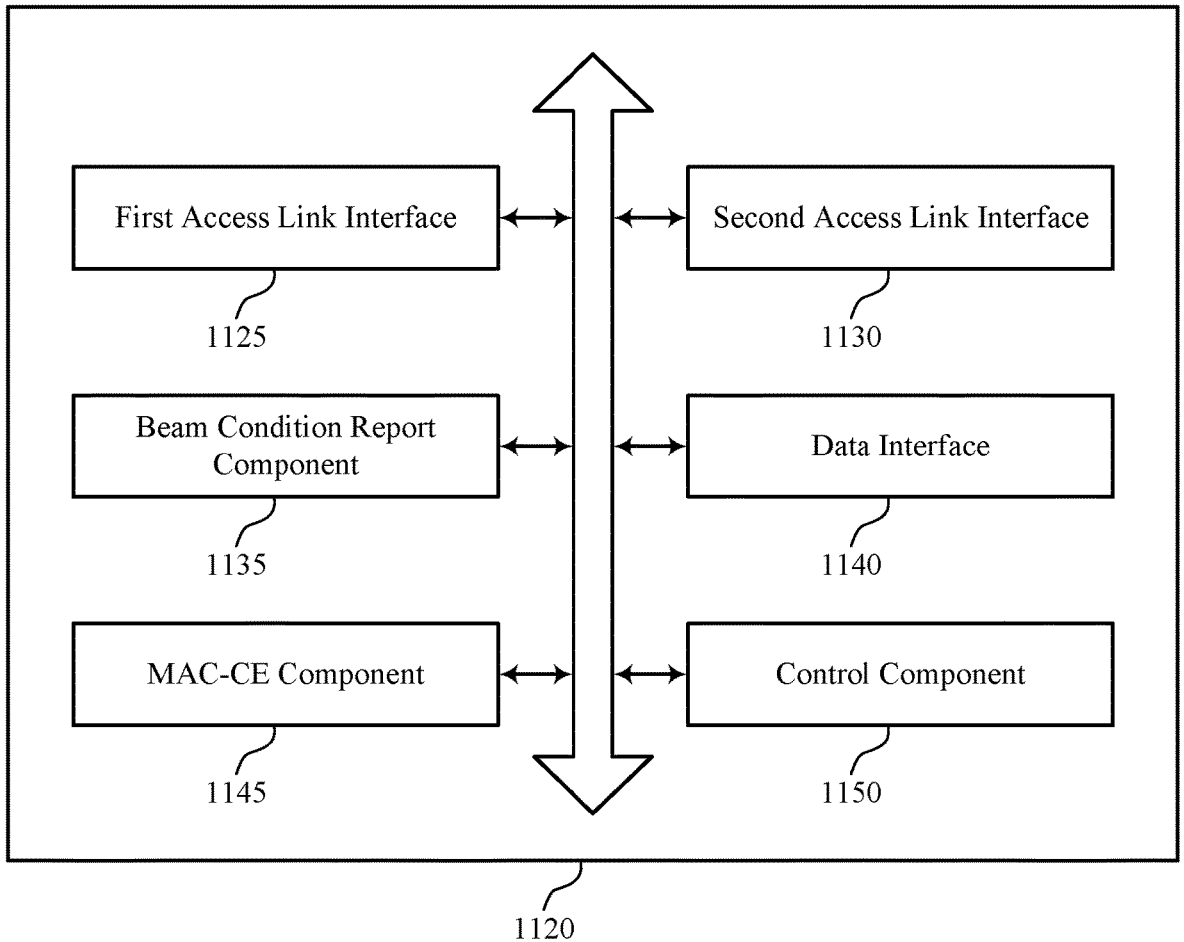
FIG. 11 shows a block diagram of a communications manager that supports multi-path beam failure reporting techniques in accordance with one or more aspects of the present disclosure.

FIG. 11 shows a block diagram 1100 of a communications manager 1120 that supports multi-path beam failure reporting techniques in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of multi-path beam failure reporting techniques as described herein. For example, the communications manager 1120 may include a first access link interface 1125, a second access link interface 1130, a beam condition report component 1135, a data interface 1140, a MAC-CE component 1145, a control component 1150, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The first access link interface 1125 may be configured as or otherwise support a means for transmitting, to a first UE via a first access link, first control signaling indicating a beam condition reporting configuration for reporting an access link beam condition to the network entity via a relay UE. The second access link interface 1130 may be configured as or otherwise support a means for transmitting, to a relay UE via a second access link, second control signaling indicating the beam condition reporting configuration that indicates to relay a beam condition report from the first UE to the network entity; and. The beam condition report component 1135 may be configured as or otherwise support a means for receiving, from the relay UE via the second access link, the beam condition report of the first UE.

In some examples, to support receiving the beam condition report, the data interface 1140 may be configured as or otherwise support a means for receiving, from the relay UE via the second access link, uplink data including the beam condition report.

In some examples, the MAC-CE component 1145 may be configured as or otherwise support a means for receiving, from the relay UE via the second access link, an access link medium access control control element including the beam condition report.

In some examples, the first access link interface 1125 may be configured as or otherwise support a means for receiving the beam condition report from the first UE via the first access link.

In some examples, the first access link interface 1125 may be configured as or otherwise support a means for receiving, from the first UE via the first access link, uplink control information or a medium access control control element including the beam condition report.

In some examples, to support transmitting the first control signaling, the control component 1150 may be configured as or otherwise support a means for transmitting the first control signaling indicating the beam condition reporting configuration from a set of multiple different beam condition reporting configurations.

In some examples, to support transmitting the first control signaling, the control component 1150 may be configured as or otherwise support a means for transmitting downlink control information or a medium access control control element indicating to switch from the beam condition reporting configuration to a second beam condition reporting configuration.

Figure 12:
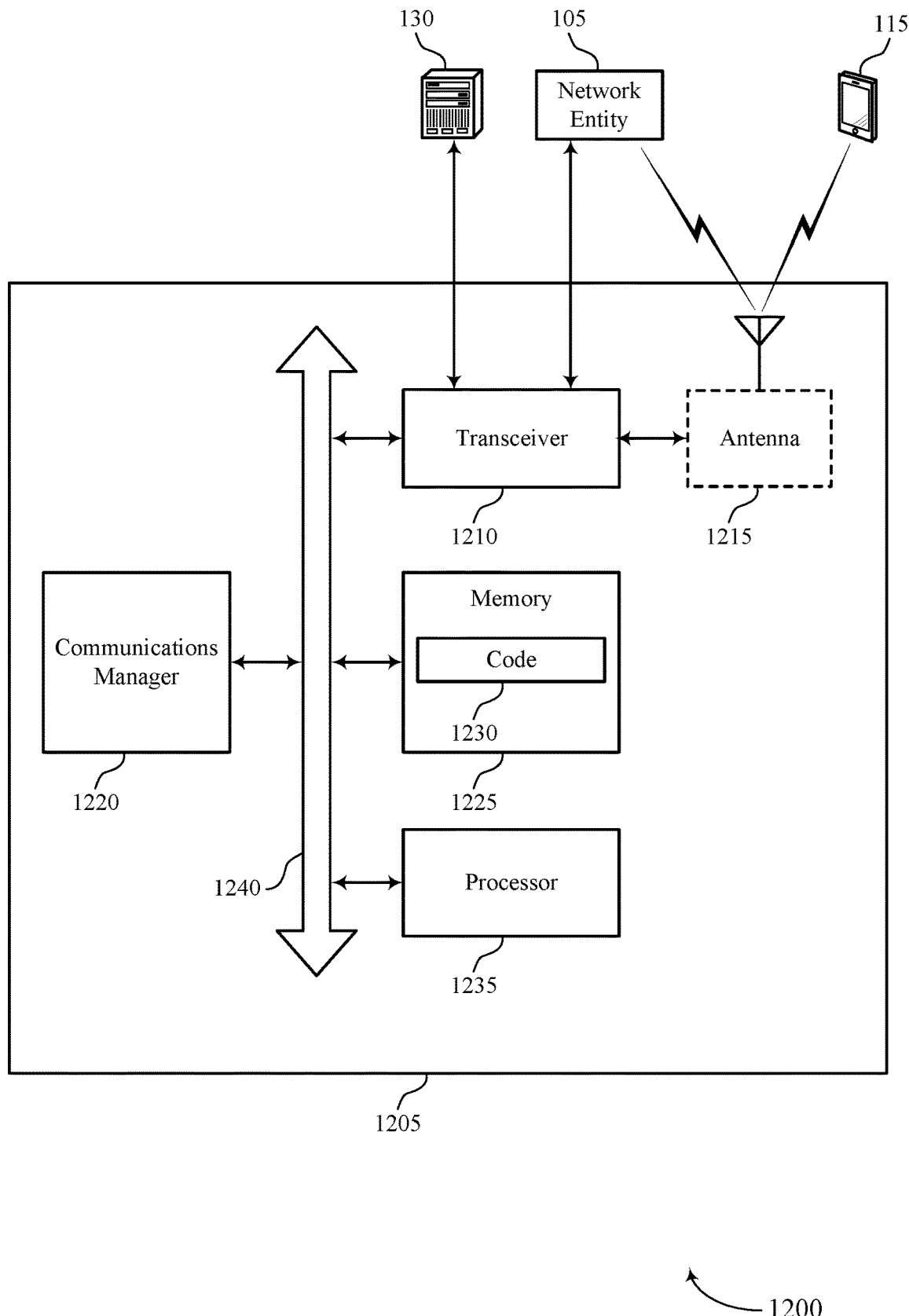
FIG. 12 shows a diagram of a system including a device that supports multi-path beam failure reporting techniques in accordance with one or more aspects of the present disclosure.

FIG. 12 shows a diagram of a system 1200 including a device 1205 that supports multi-path beam failure reporting techniques in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting multi-path beam failure reporting techniques). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting, to a first UE via a first access link, first control signaling indicating a beam condition reporting configuration for reporting an access link beam condition to the network entity via a relay UE. The communications manager 1220 may be configured as or otherwise support a means for transmitting, to a relay UE via a second access link, second control signaling indicating the beam condition reporting configuration that indicates to relay a beam condition report from the first UE to the network entity; and. The communications manager 1220 may be configured as or otherwise support a means for receiving, from the relay UE via the second access link, the beam condition report of the first UE.

By including or configuring the communications manager 1220 in accordance with examples as described herein, the device 1205 may support techniques for improved communication reliability and improved user experience related to reduced power consumption (e.g., longer battery life) due to limited use of RACH procedures or SR for reporting beam failures and increased diversity for beam condition reporting.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. For example, the communications manager 1220 may be configured to receive or transmit messages or other signaling as described herein via the transceiver 1210. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of multi-path beam failure reporting techniques as described herein, or the processor 1235 and the memory 1225 may be otherwise configured to perform or support such operations.

Figure 13:
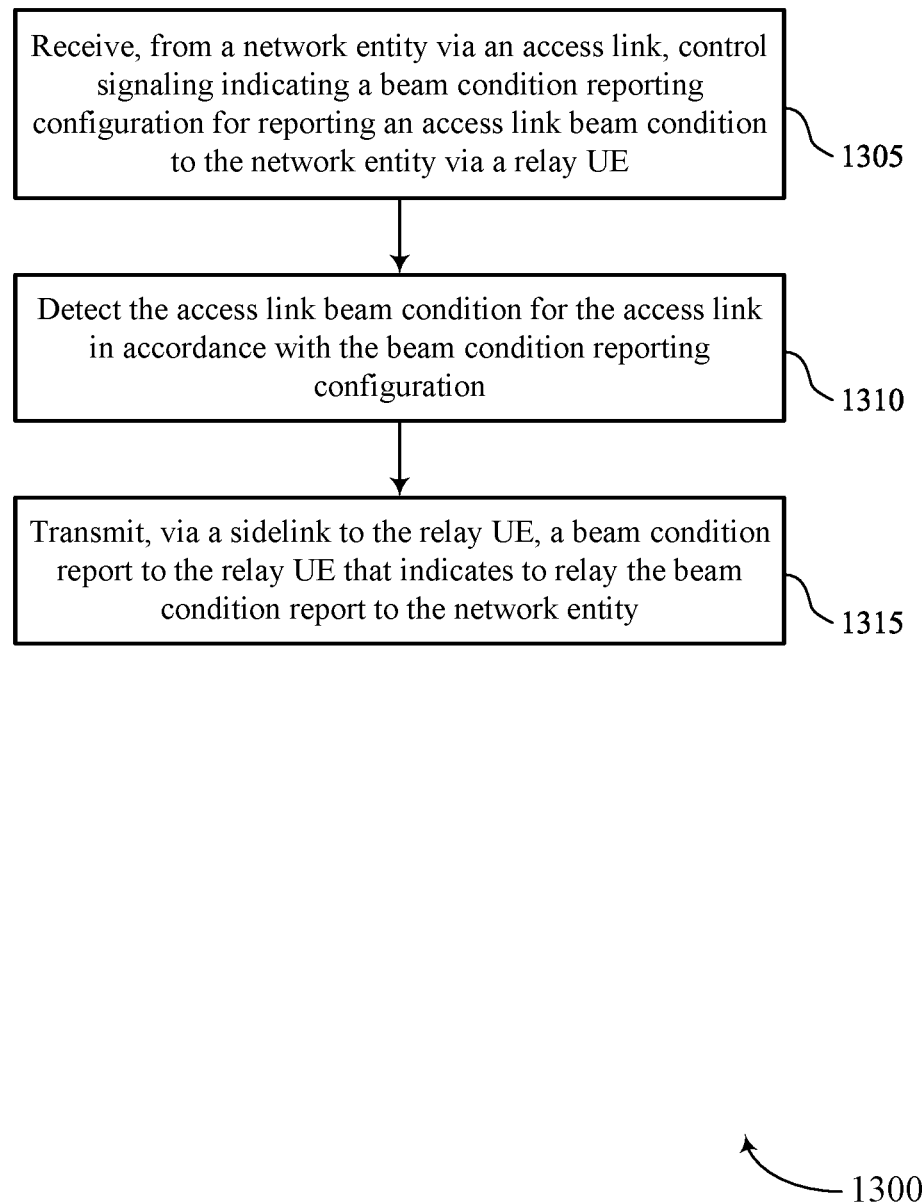
FIGS. 13 through 15 show flowcharts illustrating methods that support multi-path beam failure reporting techniques in accordance with one or more aspects of the present disclosure.

FIG. 13 shows a flowchart illustrating a method 1300 that supports multi-path beam failure reporting techniques in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity via an access link, control signaling indicating a beam condition reporting configuration for reporting an access link beam condition to the network entity via a relay UE. The operations of 1305 may be performed in accordance with examples as disclosed herein. In some examples, aspects of the operations of 1305 may be performed by a control interface 725 as described with reference to FIG. 7. Additionally or alternatively, means for performing 1305 may, but not necessarily, include, for example, antenna 825, transceiver 815, communications manager 820, memory 830 (including code 835), processor 840 and/or bus 845.

At 1310, the method may include detecting the access link beam condition for the access link in accordance with the beam condition reporting configuration. The operations of 1310 may be performed in accordance with examples as disclosed herein. In some examples, aspects of the operations of 1310 may be performed by a beam condition component 730 as described with reference to FIG. 7. Additionally or alternatively, means for performing 1310 may, but not necessarily, include, for example, antenna 825, transceiver 815, communications manager 820, memory 830 (including code 835), processor 840 and/or bus 845.

At 1315, the method may include transmitting, via a sidelink to the relay UE, a beam condition report to the relay UE that indicates to relay the beam condition report to the network entity. The operations of 1315 may be performed in accordance with examples as disclosed herein. In some examples, aspects of the operations of 1315 may be performed by a sidelink interface 735 as described with reference to FIG. 7. Additionally or alternatively, means for performing 1315 may, but not necessarily, include, for example, antenna 825, transceiver 815, communications manager 820, memory 830 (including code 835), processor 840 and/or bus 845.

Figure 14:
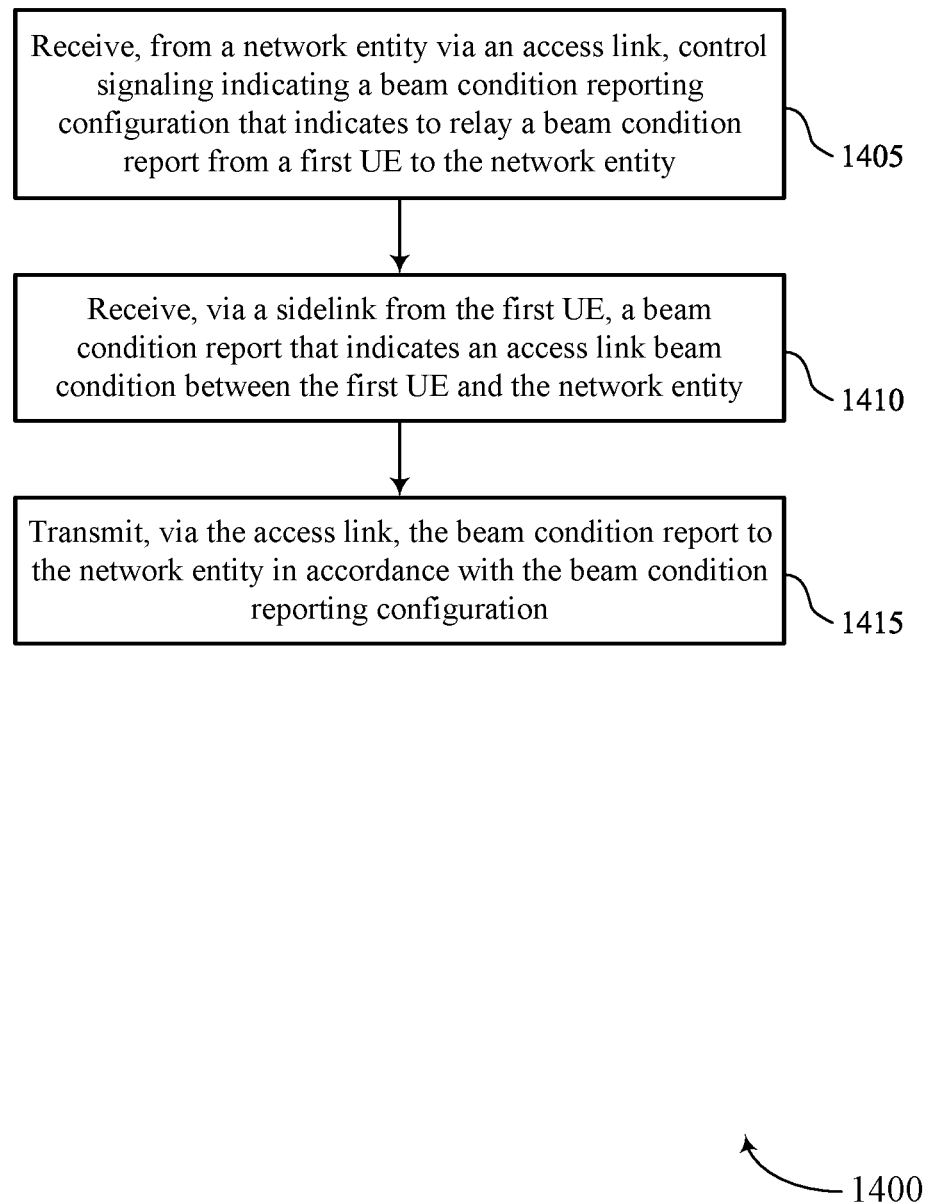

FIG. 14 shows a flowchart illustrating a method 1400 that supports multi-path beam failure reporting techniques in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity via an access link, control signaling indicating a beam condition reporting configuration that indicates to relay a beam condition report from a first UE to the network entity. The operations of 1405 may be performed in accordance with examples as disclosed herein. In some examples, aspects of the operations of 1405 may be performed by a control interface 725 as described with reference to FIG. 7. Additionally or alternatively, means for performing 1405 may, but not necessarily, include, for example, antenna 825, transceiver 815, communications manager 820, memory 830 (including code 835), processor 840 and/or bus 845.

At 1410, the method may include receiving, via a sidelink from the first UE, a beam condition report that indicates an access link beam condition between the first UE and the network entity. The operations of 1410 may be performed in accordance with examples as disclosed herein. In some examples, aspects of the operations of 1410 may be performed by a sidelink interface 735 as described with reference to FIG. 7. Additionally or alternatively, means for performing 1410 may, but not necessarily, include, for example, antenna 825, transceiver 815, communications manager 820, memory 830 (including code 835), processor 840 and/or bus 845.

At 1415, the method may include transmitting, via the access link, the beam condition report to the network entity in accordance with the beam condition reporting configuration. The operations of 1415 may be performed in accordance with examples as disclosed herein. In some examples, aspects of the operations of 1415 may be performed by an access link interface 740 as described with reference to FIG. 7. Additionally or alternatively, means for performing 1420 may, but not necessarily, include, for example, antenna 825, transceiver 815, communications manager 820, memory 830 (including code 835), processor 840 and/or bus 845.

Figure 15:
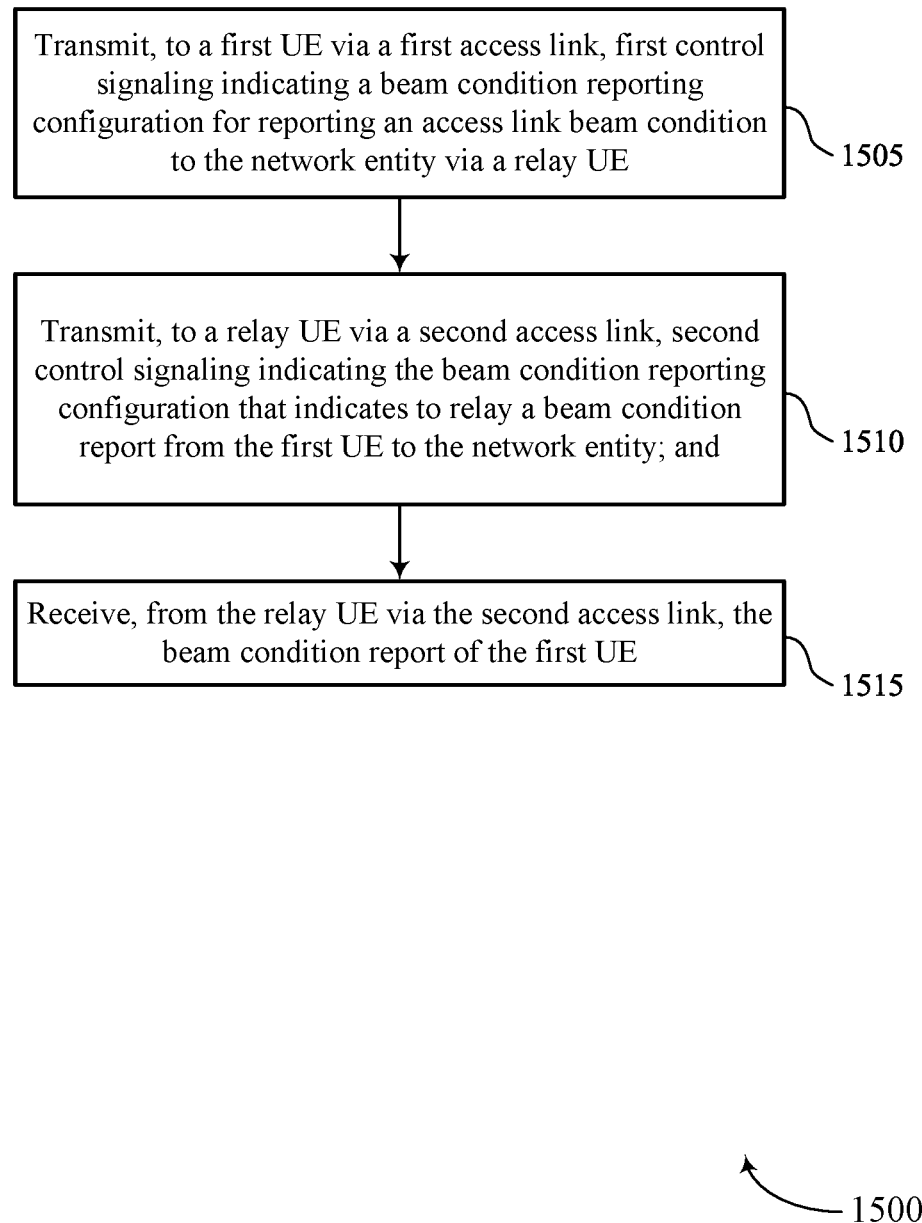

FIG. 15 shows a flowchart illustrating a method 1500 that supports multi-path beam failure reporting techniques in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to a first UE via a first access link, first control signaling indicating a beam condition reporting configuration for reporting an access link beam condition to the network entity via a relay UE. The operations of 1505 may be performed in accordance with examples as disclosed herein. In some examples, aspects of the operations of 1505 may be performed by a first access link interface 1125 as described with reference to FIG. 11. Additionally or alternatively, means for performing 1505 may, but not necessarily, include, for example, antenna 1215, transceiver 1210, communications manager 1220, memory 1225 (including code 1230), processor 1235 and/or bus 1240.

At 1510, the method may include transmitting, to a relay UE via a second access link, second control signaling indicating the beam condition reporting configuration that indicates to relay a beam condition report from the first UE to the network entity; and. The operations of 1510 may be performed in accordance with examples as disclosed herein. In some examples, aspects of the operations of 1510 may be performed by a second access link interface 1130 as described with reference to FIG. 11. Additionally or alternatively, means for performing 1510 may, but not necessarily, include, for example, antenna 1215, transceiver 1210, communications manager 1220, memory 1225 (including code 1230), processor 1235 and/or bus 1240.

At 1515, the method may include receiving, from the relay UE via the second access link, the beam condition report of the first UE. The operations of 1515 may be performed in accordance with examples as disclosed herein. In some examples, aspects of the operations of 1515 may be performed by a beam condition report component 1135 as described with reference to FIG. 11. Additionally or alternatively, means for performing 1515 may, but not necessarily, include, for example, antenna 1215, transceiver 1210, communications manager 1220, memory 1225 (including code 1230), processor 1235 and/or bus 1240.

The following provides an overview of aspects of the present disclosure:

Aspect 1: A method for wireless communication at a UE, comprising: receiving, from a network entity via an access link, control signaling indicating a beam condition reporting configuration for reporting an access link beam condition to the network entity via a relay UE; detecting the access link beam condition for the access link in accordance with the beam condition reporting configuration; and transmitting, via a sidelink to the relay UE, a beam condition report to the relay UE that indicates to relay the beam condition report to the network entity.

Aspect 2: The method of aspect 1, further comprising: transmitting sidelink data comprising the beam condition report to the relay UE.

Aspect 3: The method of any of aspects 1 through 2, further comprising: transmitting, to the relay UE via the sidelink, an access link medium access control control element tunneled in sidelink data comprising the beam condition report.

Aspect 4: The method of any of aspects 1 through 2, further comprising: transmitting a sidelink medium access control control element comprising the beam condition report to the relay UE.

Aspect 5: The method of any of aspects 1 through 4, further comprising: transmitting, via the access link, the beam condition report to the network entity.

Aspect 6: The method of any of aspects 1 through 5, further comprising: transmitting, to the network entity, uplink control information or a medium access control control element comprising the beam condition report.

Aspect 7: The method of any of aspects 1 through 6, wherein the beam condition reporting configuration is selected from a plurality of different beam condition reporting configurations.

Aspect 8: The method of any of aspects 1 through 7, further comprising: receiving radio resource control signaling indicating a plurality of different beam condition reporting configurations including the beam condition reporting configuration.

Aspect 9: The method of any of aspects 1 through 8, further comprising: receiving second control signaling indicating to switch from the beam condition reporting configuration to a second beam condition reporting configuration, wherein the second beam condition reporting configuration indicates to monitor a same access link beam as the beam condition reporting configuration or a different access link beam than the beam condition reporting configuration;

detecting a second access link beam condition for the access link in accordance with the second beam condition reporting configuration; and transmitting, via the sidelink to the relay UE, a second beam condition report that indicates to relay the second beam condition report to the network entity.

Aspect 10: The method of any of aspects 1 through 9, further comprising: receiving downlink control information or a medium access control control element indicating a switch from the beam condition reporting configuration to a second beam condition reporting configuration.

Aspect 11: The method of any of aspects 1 through 10, wherein the control signaling further indicates an access link quality threshold associated with the access link beam condition, or a quality of service threshold associated with access link data.

Aspect 12: The method of aspect 11, wherein transmitting the beam condition report to the relay UE comprises: transmitting the beam condition report based at least in part on the access link beam condition satisfying the access link quality threshold or the quality of service threshold.

Aspect 13: The method of any of aspects 1 through 12, wherein receiving the control signaling further comprises: receiving a control message that indicates activation or deactivation of the beam condition reporting configuration.

Aspect 14: The method of any of aspects 1 through 13, further comprising: transmitting a control message that requests activation or deactivation of the beam condition reporting configuration.

Aspect 15: A method for wireless communication at a relay UE, comprising: receiving, from a network entity via an access link, control signaling indicating a beam condition reporting configuration that indicates to relay a beam condition report from a first UE to the network entity; receiving, via a sidelink from the first UE, a beam condition report that indicates an access link beam condition between the first UE and the network entity; and transmitting, via the access link, the beam condition report to the network entity in accordance with the beam condition reporting configuration.

Aspect 16: The method of aspect 15, further comprising: receiving, via the sidelink, sidelink data comprising the beam condition report.

Aspect 17: The method of any of aspects 15 through 16, further comprising: receiving, via the sidelink, an access link medium access control control element tunneled in sidelink data comprising the beam condition report.

Aspect 18: The method of any of aspects 15 through 16, further comprising: receiving a sidelink medium access control control element comprising the beam condition report.

Aspect 19: A method for wireless communication at a network entity, comprising: transmitting, to a first UE via a first access link, first control signaling indicating a beam condition reporting configuration for reporting an access link beam condition to the network entity via a relay UE; transmitting, to a relay UE via a second access link, second control signaling indicating the beam condition reporting configuration that indicates to relay a beam condition report from the first UE to the network entity; and; and receiving, from the relay UE via the second access link, the beam condition report of the first UE.

Aspect 20: The method of aspect 19, wherein receiving the beam condition report further comprises: receiving, from the relay UE via the second access link, uplink data comprising the beam condition report.

Aspect 21: The method of any of aspects 19 through 20, further comprising: receiving, from the relay UE via the second access link, an access link medium access control control element comprising the beam condition report.

Aspect 22: The method of any of aspects 19 through 21, further comprising: receiving the beam condition report from the first UE via the first access link.

Aspect 23: The method of any of aspects 19 through 22, further comprising: receiving, from the first UE via the first access link, uplink control information or a medium access control control element comprising the beam condition report.

Aspect 24: The method of any of aspects 19 through 23, wherein transmitting the first control signaling further comprises: transmitting the first control signaling indicating the beam condition reporting configuration from a plurality of different beam condition reporting configurations.

Aspect 25: The method of any of aspects 19 through 24, wherein transmitting the first control signaling further comprises: transmitting downlink control information or a medium access control control element indicating to switch from the beam condition reporting configuration to a second beam condition reporting configuration.

Aspect 26: An apparatus for wireless communication at a UE, comprising a memory, transceiver, and at least one processor coupled with the memory and the transceiver, the at least one processor configured to cause the apparatus to perform a method of any of aspects 1 through 14.

Aspect 27: An apparatus for wireless communication at a UE, comprising at least one means for performing a method of any of aspects 1 through 14.

Aspect 28: A non-transitory computer-readable medium storing code for wireless communication at a UE, the code comprising instructions executable by a processor to perform a method of any of aspects 1 through 14.

Aspect 29: An apparatus for wireless communication at a relay UE, comprising a memory, transceiver, and at least one processor coupled with the memory and the transceiver, the at least one processor configured to cause the apparatus to perform a method of any of aspects 15 through 18.

Aspect 30: An apparatus for wireless communication at a relay UE, comprising at least one means for performing a method of any of aspects 15 through 18.

Aspect 31: A non-transitory computer-readable medium storing code for wireless communication at a relay UE, the code comprising instructions executable by a processor to perform a method of any of aspects 15 through 18.

Aspect 32: An apparatus for wireless communication at a network entity, comprising a memory, transceiver, and at least one processor coupled with the memory and the transceiver, the at least one processor configured to cause the apparatus to perform a method of any of aspects 19 through 25.

Aspect 33: An apparatus for wireless communication at a network entity, comprising at least one means for performing a method of any of aspects 19 through 25.

Aspect 34: A non-transitory computer-readable medium storing code for wireless communication at a network entity, the code comprising instructions executable by a processor to perform a method of any of aspects 19 through 25. It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving, from a network entity via an access link, control signaling indicating a beam condition reporting configuration that indicates that the UE is to transmit a beam condition report for reporting an access link beam condition to the network entity via a relay UE and that further indicates an access link quality threshold associated with the access link beam condition or a quality of service threshold associated with access link data, the access link beam condition or the quality of service threshold to be used by the UE for triggering transmission of the beam condition report;
detecting that the access link beam condition satisfies the access link quality threshold or the quality of service threshold for the access link in accordance with the beam condition reporting configuration; and
transmitting, via a sidelink to the relay UE based at least in part on the access link beam condition satisfying the access link quality threshold or the quality of service threshold and in accordance with the beam condition reporting configuration, the beam condition report to be used by the relay UE to relay the beam condition report to the network entity.

2. The method of claim 1, further comprising:
transmitting sidelink data comprising the beam condition report to the relay UE.

3. The method of claim 1, further comprising:
transmitting, to the relay UE via the sidelink, an access link medium access control control element tunneled in sidelink data comprising the beam condition report.

4. The method of claim 1, further comprising:
transmitting a sidelink medium access control control element comprising the beam condition report to the relay UE.

5. The method of claim 1, further comprising:
transmitting, to the network entity via the access link, uplink control information or a medium access control control element comprising the beam condition report.

6. The method of claim 1, wherein the beam condition reporting configuration is selected from a plurality of different beam condition reporting configurations.

7. The method of claim 1, further comprising:
receiving radio resource control signaling indicating a plurality of different beam condition reporting configurations including the beam condition reporting configuration.

8. The method of claim 1, further comprising:
receiving second control signaling indicating to switch from the beam condition reporting configuration to a second beam condition reporting configuration, wherein the second beam condition reporting configuration indicates to monitor a same access link beam as the beam condition reporting configuration or a different access link beam than the beam condition reporting configuration;
detecting a second access link beam condition for the access link in accordance with the second beam condition reporting configuration; and
transmitting, via the sidelink to the relay UE, a second beam condition report, the second beam condition report to be used by the relay UE to relay the second beam condition report to the network entity.

9. The method of claim 1, wherein further comprising:
receiving downlink control information or a medium access control control element indicating a switch from the beam condition reporting configuration to a second beam condition reporting configuration.

10. The method of claim 1, wherein receiving the control signaling further comprises:
receiving a control message that indicates activation or deactivation of the beam condition reporting configuration.

11. The method of claim 1, further comprising:
transmitting a control message that requests activation or deactivation of the beam condition reporting configuration.

12. The method of claim 1, further comprising:
detecting that an access link quality is worse than a relay link quality of a relay link between the UE and the relay UE, wherein the beam condition report is transmitted to the relay UE further based at least in part on the access link quality being worse than the relay link quality.

13. A method for wireless communication at a relay user equipment (UE), comprising:
receiving, from a network entity via an access link, control signaling indicating a beam condition reporting configuration that indicates to relay a beam condition report from a first UE to the network entity;
receiving, via a sidelink from the first UE, the beam condition report, wherein the beam condition report indicates an access link beam condition between the first UE and the network entity; and
transmitting, via the access link, the beam condition report to the network entity in accordance with the beam condition reporting configuration.

14. The method of claim 13, further comprising:
receiving, via the sidelink, sidelink data comprising the beam condition report.

15. The method of claim 13, further comprising:
receiving, via the sidelink, an access link medium access control control element tunneled in sidelink data comprising the beam condition report.

16. The method of claim 13, further comprising:
receiving a sidelink medium access control control element comprising the beam condition report.

17. A method for wireless communication at a network entity, comprising:
transmitting, to a first user equipment (UE) via a first access link, first control signaling indicating a beam condition reporting configuration that indicates that the first UE is to transmit a beam condition report for reporting an access link beam condition to the network entity via a relay UE and that further indicates an access link quality threshold associated with the access link beam condition or a quality of service threshold associated with access link data, the access link beam condition or the quality of service threshold to be used by the UE for triggering transmission of the beam condition report;
transmitting, to the relay UE via a second access link, second control signaling indicating the beam condition reporting configuration that indicates to relay the beam condition report from the first UE to the network entity; and
receiving, from the relay UE via the second access link based at least in part on the access link quality threshold or the quality of service threshold and in accordance with the beam condition reporting configuration, the beam condition report of the first UE.

18. The method of claim 17, wherein receiving the beam condition report further comprises:
receiving, from the relay UE via the second access link, uplink data comprising the beam condition report.

19. The method of claim 17, further comprising:

receiving, from the relay UE via the second access link, an access link medium access control control element comprising the beam condition report.

20. The method of claim 17, further comprising:
receiving the beam condition report from the first UE via the first access link.

21. The method of claim 17, further comprising:
receiving, from the first UE via the first access link, uplink control information or a medium access control control element comprising the beam condition report.

22. The method of claim 17, wherein transmitting the first control signaling further comprises:
transmitting the first control signaling indicating the beam condition reporting configuration from a plurality of different beam condition reporting configurations.

23. The method of claim 17, wherein transmitting the first control signaling further comprises:
transmitting downlink control information or a medium access control control element indicating to switch from the beam condition reporting configuration to a second beam condition reporting configuration.

24. An apparatus for wireless communication at a user equipment (UE), comprising:
memory;
a transceiver; and
at least one processor of the UE, the at least one processor coupled with the memory and the transceiver, and the at least one processor configured to cause the apparatus to:
receive, from a network entity via an access link, control signaling indicating a beam condition reporting configuration that indicates that the UE is to transmit a beam condition report for reporting an access link beam condition to the network entity via a relay UE, and that further indicates an access link quality threshold associated with the access link beam condition or a quality of service threshold associated with access link data, the access link beam condition or the quality of service threshold to be used by the UE for triggering transmission of the beam condition report;
detect that the access link beam condition satisfies the access link quality threshold or the quality of service threshold for the access link in accordance with the beam condition reporting configuration; and
transmit, via a sidelink to the relay UE based at least in part on the access link beam condition satisfying the access link quality threshold or the quality of service threshold and in accordance with the beam condition reporting configuration,
the beam condition report to be used by the relay UE to relay the beam condition report to the network entity.

25. The apparatus of claim 24, the at least one processor further configured to cause the apparatus to:
transmit sidelink data comprising the beam condition report to the relay UE.

26. The apparatus of claim 24, the at least one processor further configured to cause the apparatus to:
transmit, to the relay UE via the sidelink, an access link medium access control control element tunneled in sidelink data comprising the beam condition report.

27. The apparatus of claim 24, the at least one processor further configured to cause the apparatus to:
receive second control signaling indicating to switch from the beam condition reporting configuration to a second beam condition reporting configuration, wherein the second beam condition reporting configuration indicates to monitor a same access link beam as the beam condition reporting configuration or a different access link beam than the beam condition reporting configuration;
detect a second access link beam condition for the access link in accordance with the second beam condition reporting configuration; and
transmit, via the sidelink to the relay UE, a second beam condition report, the second beam condition report to be used by the relay UE to relay the second beam condition report to the network entity.

28. An apparatus for wireless communication at a relay user equipment (UE), comprising:
memory;
a transceiver; and
at least one processor of the relay UE, the at least one processor coupled with the memory and the transceiver, and the at least one processor configured to cause the apparatus to:
receive, from a network entity via an access link, control signaling indicating a beam condition reporting configuration that indicates to relay a beam condition report from a first UE to the network entity;
receive, via a sidelink from the first UE, the beam condition report, wherein the beam condition report indicates an access link beam condition between the first UE and the network entity; and
transmit, via the access link, the beam condition report to the network entity in accordance with the beam condition reporting configuration.

\* \* \* \* \*